United States Patent
Vlakhko et al.

(10) Patent No.: US 12,339,520 B2
(45) Date of Patent: Jun. 24, 2025

(54) CAMERA OPTICAL LENS

(71) Applicants: Changzhou AAC Raytech Optronics Co., Ltd., Changzhou (CN); DynaOptics Ltd, Singapore (SG)

(72) Inventors: Vadim Vlakhko, Moscow (RU); Fedor Churliaev, Moscow (RU); Johan Sand, Tampere (FI); Ossi Pirinen, Tampere (FI); Mika Riihimies, Tampere (FI); Tuomas Punta, Tampere (FI)

(73) Assignees: Changzhou AAC Raytech Optronics Co., Ltd., Changzhou (CN); DynaOptics Ltd, Singapore (SG)

( * ) Notice: Subject to any disclaimer, the term of this patent is extended or adjusted under 35 U.S.C. 154(b) by 612 days.

(21) Appl. No.: 17/730,108

(22) Filed: Apr. 26, 2022

(65) Prior Publication Data

US 2023/0341657 A1    Oct. 26, 2023

(51) Int. Cl.
*G02B 9/64* (2006.01)
*G02B 3/00* (2006.01)

(52) U.S. Cl.
CPC ............. *G02B 9/64* (2013.01); *G02B 3/0043* (2013.01)

(58) Field of Classification Search
CPC .................. G02B 13/0045; G02B 9/64
See application file for complete search history.

(56) References Cited

U.S. PATENT DOCUMENTS

2022/0003962 A1*   1/2022   Sun ..................... G02B 13/18

FOREIGN PATENT DOCUMENTS

| CN | 111505811 A | * | 8/2020 | ......... G02B 13/0015 |
| CN | 112147750 A | * | 12/2020 | |
| CN | 112698484 A | * | 4/2021 | ......... G02B 13/0045 |

(Continued)

OTHER PUBLICATIONS

Gross et al. "Handbook of Optical Systems vol. 3: Aberration Theory and Correction of Optical Systems" Weinheim Germany, Wiley-VCH Verlag Gmbh & Co. KGaA, pp. 377-379 (Year: 2007).*

(Continued)

*Primary Examiner* — Cara E Rakowski
(74) *Attorney, Agent, or Firm* — Wiersch Law Group

(57) ABSTRACT

Provided is a camera optical lens including seven lenses sequentially from object side to image side: first lens having negative refractive power, second lens having positive refractive power, third lens having positive refractive power, fourth lens having positive refractive power, fifth lens having negative refractive power, sixth lens having positive refractive power, seventh lens having negative refractive power and with object and image side surfaces being freeform surfaces. Focal length of camera optical lens is f; focal length of first lens is f1, focal length of third lens is f3, focal length of fourth lens is f4; refractive index of third lens is nd3; refractive index of sixth lens is nd6; refractive index of seventh lens is nd7, and following relational expressions are satisfied: $-1.52 \leq f1/f \leq -1.38$; $1.56 \leq nd3 \leq 1.59$; $1.53 \leq nd6 \leq 1.81$; $1.61 \leq nd7 \leq 1.67$; $2.04 \leq f3/f4 \leq 2.27$. The camera optical lens has excellent optical characteristics, and has large aperture, wide field of view, ultra-thinning and low optical distortion.

10 Claims, 8 Drawing Sheets

(56) References Cited

FOREIGN PATENT DOCUMENTS

CN      112748541 A  *  5/2021  ......... G02B 13/0045

OTHER PUBLICATIONS

Machine translation of CN-111505811-A retrieved electronically from PE2E Search Dec. 2024 (Year: 2024).*
Machine translation of CN-112147750-A retrieved electronically from PE2E Search Dec. 2024 (Year: 2024).*
Machine translation of CN-112698484-A retrieved electronically from PE2E Search Dec. 2024 (Year: 2024).*
Machine translation of CN-112748541-A retrieved electronically from PE2E Search Dec. 2024 (Year: 2024).*

* cited by examiner

CAMERA OPTICAL LENS

TECHNICAL FIELD

The present disclosure relates to the field of optical lenses and, in particular, to a camera optical lens suitable for portable terminal devices such as smart phones and digital cameras, as well as imaging devices such as monitors and PC lenses.

BACKGROUND

With the development of imaging lenses, people have higher requirements for imaging lenses. Performance of night scene photography and background bokeh of the lens have also become important indicators to measure the imaging standard of the lens. At present, rotational symmetric aspheric surfaces are mostly adopted. Such aspheric surfaces have sufficient degrees of freedom only in the meridional plane and cannot correct off-axis aberrations well. In addition, distribution of focal power, lens spacing and lens shape configurations of the conventional structure are not desired, resulting in insufficient ultra-thinning and wide-angle extent of the lens. Freeform surface is a non-rotational symmetrical surface, which can better balance aberrations and improve imaging quality, and processing level of freeform surfaces is gradually improving. With the increasing improvement requirements for imaging performance of the lens, it is very important to add free-form surfaces during lens design, especially in the design of wide-angle and ultra-wide-angle lenses.

SUMMARY

In order to solve the above technical problems, embodiments of the present disclosure provide a camera optical lens. The camera optical lens includes seven lenses, sequentially from the object side to the image side: a first lens having negative refractive power, a second lens having positive refractive power, a third lens having positive refractive power, a fourth lens having positive refractive power, a fifth lens having negative refractive power, a sixth lens having positive refractive power, and a seventh lens having negative refractive power, wherein an object side surface and an image side surface of the seventh lens are free-form surfaces.

A focal length of the camera optical lens is f; a focal length of the first lens is f1; a focal length of the third lens is f3; a focal length of the fourth lens is f4; a refractive index of the third lens is nd3; a refractive index of the sixth lens is nd6; a refractive index of the seventh lens is nd7, and f, f1, f3, f4, nd3, nd6 and nd7 satisfy the following relational expressions $-1.52 \leq f1/f \leq -1.38$;

$1.56 \leq nd3 \leq 1.59$;

$1.53 \leq nd6 \leq 1.81$;

$1.61 \leq nd7 \leq 1.67$;

$2.04 \leq f3/f4 \leq 2.27$.

As an improvement, a curvature radius of an object side surface of the seventh lens is R13, a curvature radius of an image side surface of the seventh lens is R14, and R13 and R14 satisfy the following relational expression:

$1.06 \leq (R13+R14)/(R13-R14) \leq 1.22$

As an improvement, a refractive index of the fifth lens is nd5, and nd5 satisfies the following relational expression:

$1.64 \leq nd5 \leq 1.67$.

As an improvement, an object side surface of the first lens is convex at a paraxial position, and an image side surface of the first lens is concave at a paraxial position. A central radius of curvature of the object side surface of the first lens is R1, a central radius of curvature of the image side surface of the first lens is R2, an on-axis thickness of the first lens is d1, and a total optical length of the camera optical lens is TTL, and R1, R2, d1 and TTL satisfy the following relational expressions:

$1.43 \leq (R1+R2)/(R1-R2) \leq 1.95$;

$0.04 \leq d1/TTL \leq 0.07$.

As an improvement, an object side surface of the second lens is convex at a paraxial position, and an image side surface of the second lens is concave at a paraxial position. A focal length of the second lens is f2, a central radius of curvature of the object side surface of the second lens is R3, a central radius of curvature of the image side surface of the second lens is R4, and an on-axis thickness of the second lens is d3, a total optical length of the camera optical lens is TTL, and f, f2, R3, R4, d3 and TTL satisfy the following relational expressions:

$3.10 \leq f2/f \leq 3.40$;

$-3.26 \leq (R3+R4)/(R3-R4) \leq -2.79$;

$0.04 \leq d3/TTL \leq 0.06$.

As an improvement, an object side surface of the third lens is convex at a paraxial position, and an image side surface of the third lens is concave at a paraxial position. A focal length of the third lens is f3, a central radius of curvature of the object side surface of the third lens is R5, a central radius of curvature of the image side surface of the third lens is R6, and an on-axis thickness of the third lens is d5, a total optical length of the camera optical lens is TTL, and f, f3, R5, R6, d5 and TTL satisfy the following relational expressions:

$3.04 \leq f3/f \leq 3.43$;

$-1.42 \leq (R5+R6)/(R5-R6) \leq -1.28$;

$0.05 \leq d5/TTL \leq 0.06$.

As an improvement, an object side surface of the fourth lens is convex at a paraxial position, and an image side surface of the fourth lens is convex at a paraxial position. A focal length of the fourth lens is f4, a central radius of curvature of the object side surface of the fourth lens is R7, a central radius of curvature of the image side surface of the fourth lens is R8, and an on-axis thickness of the fourth lens is d7, a total optical length of the camera optical lens is TTL, and f, f4, R7, R8, d7 and TTL satisfy the following relational expressions:

$1.48 \leq f4/f \leq 1.52$;

$0.37 \leq (R7+R8)/(R7-R8) \leq 0.45$;

$0.10 \leq d7/TTL \leq 0.12$.

As an improvement, an object side surface of the fifth lens is concave at a paraxial position, and an image side surface of the fifth lens is convex at a paraxial position. A focal length of the fifth lens is f5, a central radius of curvature of the object side surface of the fifth lens is R9, a central radius of curvature of the image side surface of the fifth lens is R10, and an on-axis thickness of the fifth lens is d9, a total optical length of the camera optical lens is TTL, and f, f5, R9, R10, d9 and TTL satisfy the following relational expressions:

$-3.99 \leq f5/f \leq -3.63;$ $-5.59 \leq (R9+R10)/(R9-R10) \leq -3.20;$ $0.03 \leq d9/TTL \leq 0.04.$ As an improvement, an image side surface of the sixth lens is convex at a paraxial position. A focal length of the sixth lens is f6, a central radius of curvature of an object side surface of the sixth lens is R11, a central radius of curvature of the image side surface of the sixth lens is R12, and an on-axis thickness of the sixth lens is d11, a total optical length of the camera optical lens is TTL, and f, f6, R11, R12, d11 and TTL satisfy the following relational expressions:

$0.75 \leq f6/f \leq 0.79;$ $0.92 \leq (R11+R12)/(R11-R12) \leq 1.10;$ $0.18 \leq d11/TTL \leq 0.20.$ As an improvement, an object side surface of the seventh lens is convex at a paraxial position, and an image side surface of the seventh lens is concave at a paraxial position. A focal length of the seventh lens is f7, an on-axis thickness of the seventh lens is d13, a total optical length of the camera optical lens is TTL, and f, f7, d13 and TTL satisfy the following relational expressions:

$-0.95 \leq f7/f \leq -0.85;$ $0.12 \leq d13/TTL \leq 0.14.$

As an improvement, a focal length in an x-direction of the seventh lens is f7x, a focal length in a y-direction of the seventh lens is f7y, and f7x and f7y satisfy the following relational expressions:

$-0.93 \leq f7y/f \leq -0.85;$ $0.99 \leq f7y/f7x \leq 1.01.$

The beneficial effects of the present disclosure are as follows: the camera optical lens according to the present disclosure has excellent optical characteristics, and has the characteristics of large aperture, wide field of view, ultra-thinning, low optical distortion, low SMIA TV distortion, and short track length. In addition, the present disclosure adopts free-form surfaces, which helps to control distortion, allow sharp image projection throughout the full sensor area, especially suitable for mobile phone camera optical lens assembly and WEB camera optical lens composed of high-pixel CCD, CMOS and other imaging elements.

BRIEF DESCRIPTION OF DRAWINGS

In order to better describe technical solutions in embodiments of the present disclosure, the accompanying drawings used in the description of the embodiments are briefly described as follows. It is appreciated that, the drawings in the following description are only some embodiments of the present disclosure. For those of ordinary skill in the art, other drawings can also be obtained from these drawings without creative efforts.

DESCRIPTION OF EMBODIMENTS

In order to better illustrate the objectives, technical solutions and advantages of the present disclosure, embodiments of the present disclosure will be described in detail below with reference to the accompanying drawings. However, those of ordinary skill in the art can understand that, in the various embodiments of the present disclosure, many technical details are set forth for a thorough comprehension of the present disclosure. The technical solutions claimed in the present disclosure can be realized even without these technical details and various changes and modifications based on the following embodiments.

First Embodiment

Figure 1:
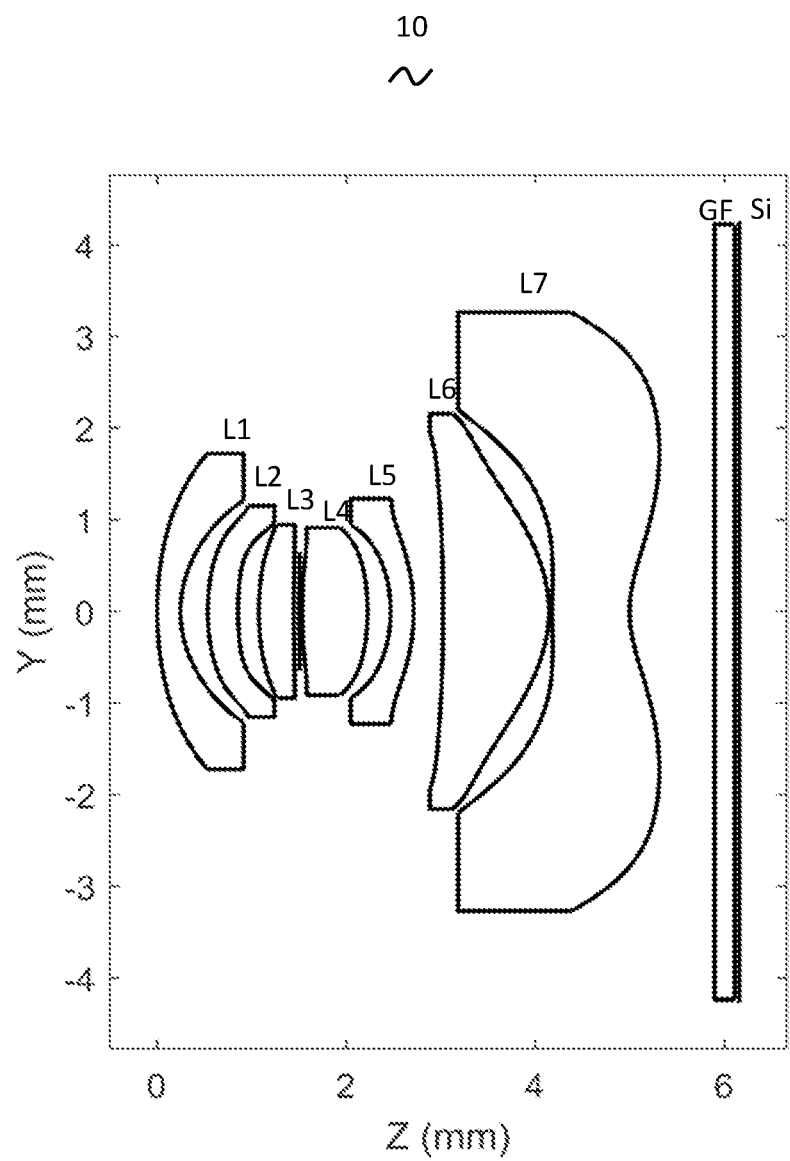
FIG. 1 is a schematic structural diagram of a camera optical lens according to a first embodiment of the present disclosure.

Referring to the accompanying drawings, the present disclosure provides a camera optical lens 10. FIG. 1 shows a camera optical lens 10 according to the first embodiment of the present disclosure. The camera optical lens 10 is composed of seven lenses including, from an object side to an image side, a first lens L1, a second lens L2, a third lens L3, a fourth lens L4, a fifth lens L5, a sixth lens L6 and a seventh lens L7. Optical elements such as an glass filter GF may be provided between the seventh lens L7 and an image plane Si.

In this embodiment, the first lens L1 has negative refractive power, the second lens L2 has positive refractive power, the third lens L3 has positive refractive power, the fourth lens L4 has positive refractive power, and the fifth lens L5 has negative refractive power, the sixth lens L6 has positive refractive power, an object side and an image side of the seventh lens L7 are free curved surfaces, and the seventh lens L7 has negative refractive power. Those skilled in the art can understand that, in order to better correct the aberration, it is better to design surfaces of the seven lens as aspherical surfaces.

In this embodiment, the first lens L1 is made of plastic material, the second lens L2 is made of plastic material, the third lens L3 is made of plastic material, the fourth lens L4 is made of plastic material, the fifth lens L5 is made of plastic material, and the sixth lens L6 is made of glass, and the seventh lens L7 is made of plastic material. In other optional embodiments, each lens may also be made of other materials.

In this embodiment, a focal length of the camera optical lens 10 is defined as f; the focal length of the first lens L1 is f1. f and f1 satisfy the following relational expression: $-1.52 \leq f1/f \leq -1.38$, which specifies the negative refractive power of the first lens L1. Satisfying this condition helps the camera optical lens 10 to obtain a good balance of field curvature, thereby improving image quality.

In this embodiment, a refractive index of the third lens L3 is defined as nd3, which satisfies the following relational expression: $1.56 \leq nd3 \leq 1.59$, which specifies the refractive index of the third lens L3, and the refractive power within this range is beneficial to thinning of the lens, and is conducive to the use of plastic materials.

In this embodiment, a refractive index of the sixth lens L6 is defined as nd6, which satisfies the following relational expression: $1.53 \leq nd6 \leq 1.81$, which specifies the refractive index of the sixth lens L6, and the refractive power within this range is beneficial to thinning of the lens and is also conducive to correction of aberrations.

In this embodiment, a refractive index of the seventh lens L7 is defined as nd7, which satisfies the following relational expression: $1.61 \leq nd7 \leq 1.67$, which specifies the refractive index of the seventh lens L7, and the refractive power within this range is beneficial to thinning of the lens, and is conducive to the use of plastic materials.

In this embodiment, a focal length of the third lens L3 is defined as f3, and a focal length of the fourth lens L4 is f4. f3 and f4 satisfy the following relational expression: $2.04 \leq f3/f4 \leq 2.27$, which specifies the ratio between the focal length of the third lens L3 and the focal length of the fourth lens L4, and a ratio within this range can reduce tolerance sensitivity of the imaging optics, thereby improving image quality.

In this embodiment, a curvature radius of an object side surface of the seventh lens L7 is defined as R13, and a curvature radius of an image side surface of the seventh lens L7 is defined as R14. R13 and R14 satisfy the following relational expression: $1.06 \leq (R13+R14)/(R13-R14) \leq 1.22$, which specifies the shape of the seventh lens L7. Within the range, as the lens develops towards an ultra-thin and wide-angle lens, problems such as off-axis aberration and on-axis chromatic aberration can be well corrected.

In this embodiment, a refractive index of the fifth lens L5 is nd5 and satisfies the following relational expression: $1.64 \leq nd5 \leq 1.67$, which specifies the refractive index of the fifth lens L5, and the refractive power within this range is beneficial to thinning of the lens, and is conducive to the use of plastic materials. Optionally, $1.65 \leq nd5 \leq 1.66$ is satisfied.

In this embodiment, an object side surface of the first lens L1 is convex at a paraxial position, and an image side surface of the first lens L1 is concave at a paraxial position. In other optional embodiments, the object side surface and the image side surface of the first lens L1 can also have other convex and concave configurations.

A central radius of curvature of an object side of the first lens L1 is defined as R1, and a central radius of curvature of an image side of the first lens L1 is defined as R2. R1 and R2 satisfy the following relational expression: $1.43 \leq (R1+R2)/(R1-R2) \leq 1.95$, which specifies the shape of the first lens L1. Within the range, problems such as off-axis aberrations as well as on-axis chromatic aberrations are well corrected.

An on-axis thickness of the first lens L1 is defined as d1, and a total optical length from the object side surface of the first lens to an image plane of the camera optical lens 10 along an optical axis is defined TTL. d1 and TTL satisfy the following relational expression: $0.04 \leq d1/TTL \leq 0.07$, which specifies the thickness of the first lens L1. Within this range, it is beneficial to achieve ultra-thinning.

In this embodiment, an object side surface of the second lens L2 is convex at a paraxial position, and an image side surface of the second lens L2 is concave at a paraxial position. In other optional embodiments, the object side and image side of the second lens L2 can also have other concave and convex configurations.

A focal length of the camera optical lens 10 is defined as f, and a focal length of the second lens L2 is defined as f2, f and f2 satisfy the following relational expression: $3.10 \leq f2/f \leq 3.40$, which specifies the positive refractive power of the second lens L2, and the ratio within this range can reasonably and effectively balance the field curvature of the system, thereby improving the imaging quality.

A central radius of curvature of an object side surface of the second lens L2 is defined as R3, and a central radius of curvature of an image side surface of the second lens L2 is R4. R3 and R4 satisfy the following relational expression: $-3.26 \leq (R3+R4)/(R3-R4) \leq -2.79$, which specifies the shape of the second lens L2. Within the range, problems like off-axis aberrations as well as on-axis chromatic aberrations are well corrected.

An on-axis thickness of the second lens L2 is defined as d3, and the total optical length of the camera optical lens 10 is TTL. d3 and TTL satisfy the following relational expression: $0.04 \leq d3/TTL \leq 0.06$, which specifies the thickness of the second lens L2. Within this range, it is beneficial to achieve ultra-thinning.

In this embodiment, an object side surface of the third lens L3 is convex at a paraxial position, and an image side surface of the third lens L3 is concave at a paraxial position. In other optional embodiments, the object side and image side of the third lens L3 can also have other concave and convex configurations.

The focal length of the camera optical lens 10 is defined as f, and the focal length of the third lens L3 is f3. f and f3 satisfy the following relational expression: $3.04 \leq f3/f \leq 3.43$, which satisfies the positive refractive power of the third lens L3. This condition enables the system to have better imaging quality and lower tolerance sensitivity, thereby improving imaging quality.

A central radius of curvature of an object side surface of the third lens L3 is defined as R5, and a central radius of curvature of an image side surface of the third lens L3 is defined as R6. R5 and R6 satisfy the following relational expressional expression: $-1.42 \leq (R5+R6)/(R5-R6) \leq -1.28$, which specifies the shape of the third lens L3. Within the range, the shape of the third lens L3 can be effectively controlled. It is beneficial to the shaping of the third lens L3, and since the surface curvature of the third lens L3 is very large, it is possible to avoid bad shaping and the generation of stress. Thus, problems such as off-axis aberration and on-axis chromatic aberration are well corrected.

An on-axis thickness of the third lens L3 is defined as d5, and the total optical length of the camera optical lens 10 is TTL. d5 and TTL satisfy the following relational expression: $0.05 \leq d5/TTL \leq 0.06$, it is specified that the third lens L3 Within this range, it is beneficial to achieve ultra-thinning.

In this embodiment, the object side surface of the fourth lens L4 is convex at the paraxial position, and the image side surface of the fourth lens L4 is convex at the paraxial position; in other optional embodiments, the fourth lens, the object side and image side of L4 can also have other concave and convex configurations.

The focal length of the camera optical lens 10 is defined as f, and the focal length of the fourth lens L4 is f4. f and f4 satisfy the following relational expression: $1.48 \leq f4/f \leq 1.52$, which specifies the positive refractive power of the fourth lens L4. Within this range, it is not only conducive to ultra-thinning and ultra-thinning, but also can better correct aberrations.

A central radius of curvature of an object side surface of the fourth lens L4 is defined as R7, and a central radius of curvature of an image side surface of the fourth lens L4 is defined as R8. R7 and R8 satisfy the following relational expressional expression: $0.37 \leq (R7+R8)/(R7-R8) \leq 0.45$, which specifies the shape of the fourth lens L4. This condition reasonably controls the shape of the fourth lens L4, and within the range, the spherical aberration of the system can be effectively corrected.

An on-axis thickness of the fourth lens L4 is defined as d7, and the total optical length of the camera optical lens 10 is TTL. R7 and TTL satisfy the following relational expression: $0.10 \leq d7/TTL \leq 0.12$, which specifies the thickness of the fourth lens L4. Within this range, it is beneficial to achieve ultra-thinning.

In this embodiment, an object side of the fifth lens L5 is concave at a paraxial position, and an image side of the fifth lens L5 is convex at a paraxial position. In other optional embodiments, the object side and image side of the fifth lens L5 can also have other concave and convex configurations.

A focal length of the camera optical lens 10 is defined as f, and a focal length of the fifth lens L5 is f5. f and f5 satisfy the following relational expression: $-3.99 \leq f5/f \leq -3.63$, which specifies the negative refractive power of the fifth lens L5. Satisfying this condition can effectively make the light angle of the camera optical lens 10 flat and reduce the tolerance sensitivity.

A central radius of curvature of the object side surface of the fifth lens L5 is defined as R9, and a central radius of curvature of the image side surface of the fifth lens L5 is defined as R10. R9 and R10 satisfy the following relational expression: $-5.59 \leq (R9+R10)/(R9-R10) \leq -3.20$, which specifies the shape of the fifth lens L5. In the range, off-axis aberration can be well corrected while achieving wide-angle and ultra-thinning.

An on-axis thickness of the fifth lens L5 is defined as d9, and the total optical length of the camera optical lens is TTL. d9 and TTL satisfy the following relational expression: $0.03 \leq d9/TTL \leq 0.04$, which specifies the thickness of the fifth lens L5. Within this range, is conducive to achieving ultra-thinning.

In this embodiment, an object side surface of the sixth lens L6 is concave at a paraxial position, and an image side surface of the sixth lens L6 is convex at a paraxial position. In other optional embodiments, the object side surface and the image side surface of the sixth lens L6 can also have other concave and convex configurations.

A focal length of the camera optical lens 10 is defined as f, and the focal length of the sixth lens L6 is defined as f6. f and f6 satisfy the following relational expression: $0.75 \leq f6/f \leq 0.79$, which specifies the positive refractive power of the sixth lens L6. A ratio within this range can reduce the tolerance sensitivity of the camera optical lens 10, thereby improving image quality.

A central radius of curvature of an object side surface of the sixth lens L6 is defined as R11, and a central radius of curvature of an image side surface of the sixth lens L6 is R12. R11 and R12 satisfy the following relational expression: $0.92 \leq (R11+R12)/(R11-R12) \leq 1.10$, which specifies the shape of the sixth lens L6. Within this range, off-axis chromatic aberration is well corrected.

An on-axis thickness of the sixth lens L6 is defined as d11, and the total optical length of the camera optical lens 10 is TTL. d11 and TTL satisfy the following relational expression: $0.18 \leq d11/TTL \leq 0.20$, which specifies the sixth lens L6. Within this range, it is beneficial to achieve ultra-thinning.

In this embodiment, an object side of the seventh lens L7 is convex at a paraxial position, and an image side of the seventh lens L7 is concave at a paraxial position. In other optional embodiments, the object side and image side of the seventh lens L7 can also have other concave and convex configurations.

A focal length of the camera optical lens 10 is defined as f, and the focal length of the seventh lens L7 is f7. f and f7 satisfy the following relational expression: $-0.95 \leq f7/f \leq -0.85$, which specifies the negative refractive power of the seventh lens L7. The ratio within this range can reduce the tolerance sensitivity of the camera optical lens 10, and a proper refractive index distribution enables the system to have better imaging quality.

An on-axis thickness of the seventh lens L7 is defined as d13, and the total optical length of the camera optical lens is TTL. d13 and TTL the following relational expression: $0.12 \leq d13/TTL \leq 0.14$, which specifies the seventh lens L7. Within this range, is conducive to achieving ultra-thinning.

A focal length of the x-direction of the seventh lens is defined as f7x, and the focal length in the y-direction of the seventh lens is defined as f7y. f, f7x and f7y satisfy the following relational expression: $-0.93 \leq f7y/f \leq -0.85$, $0.99 \leq f7y/f7x \leq 1.01$, which specify the refractive power of the seventh lens L7 in the X and Y directions, and the appropriate difference reduces the distortion. Optionally, $-0.92 \leq f7y/f \leq -0.88$, $0.99 \leq f7y/f7x \leq 1.00$ is satisfied.

In this embodiment, an image height of the camera optical lens 10 is IH, the total optical length of the camera optical lens 10 is TTL, and the following relational formula is satisfied: $TTL/IH \leq 0.85$, which is beneficial to realize ultra-thinning. Optionally, $TTL/IH \leq 0.82$ is satisfied.

In this embodiment, a FOV of the camera optical lens 10 is greater than or equal to 117.21°, so as to achieve a wide field of view. Optionally, the FOV of the camera optical lens is greater than or equal to 118.40°.

In this embodiment, the aperture value FNO of the camera optical lens 10 is less than or equal to 2.03, so that a large aperture is achieved and the imaging performance of the camera optical lens is good. Optionally, the aperture value FNO of the camera optical lens 10 is less than or equal to 1.99.

While the camera optical lens 10 has good optical performance, it can meet the design requirements of large aperture, wide field of view, ultra-thinning, and low distortion. According to the characteristics of the camera optical lens 10, the camera optical lens 10 is especially suitable for high pixel mobile phone camera lens assembly and WEB camera lens composed of CCD, CMOS and other camera components.

The camera optical lens 10 of the present disclosure will be described below with examples. The symbols described in each example are as follows. The unit of focal length, on-axis distance, central radius of curvature, on-axis thickness, position of inflection point and position of arrest point is mm.

TTL: total optical length (the on-axis distance from the object side of the first lens L1 to the image plane Si), in mm;

Aperture value FNO: the ratio of the effective focal length of the camera optical lens to the diameter of the entrance pupil.

Optionally, an inflection point and/or an arrest point may also be set on the object side and/or the image side of the lens to meet high-quality imaging requirements.

Table 1, Table 2, and Table 3 show design data of the camera optical lens 10 according to the first embodiment of the present disclosure.

TABLE 1

|  | R |  | d |  | nd |  | vd |
|---|---|---|---|---|---|---|---|
| S1 | ∞ | d0 = | 0.000 | / |  | / |  |
| R1 | 3.994 | d1 = | 0.246 | nd1 | 1.5444 | v1 | 56.43 |
| R2 | 1.284 | d2 = | 0.289 |  |  |  |  |
| R3 | 2.360 | d3 = | 0.322 | nd2 | 1.6359 | v2 | 23.82 |
| R4 | 4.452 | d4 = | 0.219 |  |  |  |  |
| R5 | 3.439 | d5 = | 0.369 | nd3 | 1.5661 | v3 | 37.71 |
| R6 | 19.884 | d6 = | 0.055 |  |  |  |  |
| S2 | 21.067 | / | 0.036 | / | / | / | / |
| R7 | 6.814 | d7 = | 0.689 | nd4 | 1.5444 | v4 | 56.43 |
| R8 | −2.598 | d8 = | 0.244 |  |  |  |  |
| R9 | −1.679 | d9 = | 0.244 | nd5 | 1.6701 | v5 | 19.39 |
| R10 | −2.411 | d10 = | 0.310 |  |  |  |  |
| R11 | −42.188 | d11 = | 1.122 | nd6 | 1.8061 | v6 | 40.90 |
| R12 | −1.467 | d12 = | 0.035 |  |  |  |  |
| R13 | 13.318 | d13 = | 0.816 | nd7 | 1.6610 | v7 | 20.53 |
| R14 | 1.284 | d14 = | 0.900 |  |  |  |  |
| R15 | ∞ | d15 = | 0.210 | ndg | 1.5168 | vg | 64.17 |
| R16 | ∞ | d16 = | 0.050 |  |  |  |  |

The meaning of the symbols is as follows.
S1: first aperture;
S2: second aperture;
S3: third aperture;
R: radius of curvature at the center of the optical surface;
R1: central radius of curvature of the object side surface of the first lens L1;
R2: central radius of curvature of the image side surface of the first lens L1;
R3: central radius of curvature of the object side surface of the second lens L2;
R4: central radius of curvature of the image side surface of the second lens L2;
R5: central radius of curvature of the object side surface of the third lens L3;
R6: central radius of curvature of the image side surface of the third lens L3;
R7: central radius of curvature of the object side surface of the fourth lens L4;
R8: central radius of curvature of the image side surface of the fourth lens L4;
R9: central radius of curvature of the object side surface of the fifth lens L5;
R10: central radius of curvature of the image side surface of the fifth lens L5;
R11: central radius of curvature of the object side surface of the sixth lens L6;
R12: central radius of curvature of the image side surface of the sixth lens L6;
R13: central radius of curvature of the object side surface of the seventh lens L7;
R14: central radius of curvature of the image side surface of the seventh lens L7;
R15: the central radius of curvature of the object side surface of the glass filter GF;
R16: central radius of curvature of the image side surface of the glass filter GF;
d: on-axis thickness of lens, on-axis distance between lenses;
d0: on-axis distance from the first aperture S1 to the object side of the first lens L1;
d1: on-axis thickness of the first lens L1;
d2: axis distance from the image side of the first lens L1 to the object side of the second lens L2;
d3: on-axis thickness of the second lens L2;
d4: the on-axis distance from the image side of the second lens L2 to the object side of the third lens L3;
d5: on-axis thickness of the third lens L3;
d6: on-axis distance from the image side of the third lens L3 to the object side of the fourth lens L4;
d7: on-axis thickness of the fourth lens L4;
d8: the on-axis distance from the image side of the fourth lens L4 to the object side of the fifth lens L5;
d9: on-axis thickness of the fifth lens L5;
d10: on-axis distance from the image side of the fifth lens L5 to the object side of the sixth lens L6;
d11: on-axis thickness of the sixth lens L6;
d12: on-axis distance from the image side of the sixth lens L6 to the object side of the seventh lens L7;
d13: on-axis thickness of the seventh lens L7;
d14: on-axis distance from the image side of the seventh lens L7 to the object side of the glass filter GF;
d15: on-axis thickness of the glass filter GF;
nd: refractive index of the d line (the d line is green light with a wavelength of 550 nm);
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
nd6: refractive index of the d-line of the sixth lens L6;
nd7: refractive index of the d-line of the seventh lens L7;
ndg: refractive index of the d-line of the glass filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the sixth lens L6;
v7: Abbe number of the seventh lens L7;
vg: Abbe number of glass filter GF;

Table 2 shows aspherical surface data of the first lens L1 to the sixth lens L6 in the camera optical lens 10 according to the first embodiment of the present disclosure.

TABLE 2

| | Conic coefficient | Aspheric coefficient | | | | |
|---|---|---|---|---|---|---|
| | k | A4 | A6 | A8 | A10 | A12 |
| R1 | 2.1199E+00 | 1.6459E−02 | −6.6702E−03 | 2.0361E−03 | 1.0577E−04 | −1.2736E−04 |
| R2 | −3.9090E−01 | −2.2126E−02 | −7.7473E−03 | 2.0181E−02 | −1.3540E−03 | −3.1288E−03 |
| R3 | −3.2924E+00 | 2.2609E−02 | 1.5861E−01 | −4.6376E−02 | −2.9774E−03 | 6.6051E−03 |
| R4 | 1.0184E+01 | 1.4557E−01 | 2.7400E−01 | −5.5020E−02 | −4.0625E−02 | 1.8934E−01 |
| R5 | −2.8493E+01 | 1.8453E−01 | 4.8944E−02 | −4.5884E−01 | 6.8251E−01 | −7.9694E−02 |
| R6 | 1.6914E+02 | 3.7165E−02 | −1.4146E−01 | 2.8642E−01 | −6.9572E−01 | 7.9166E−01 |

TABLE 2-continued

| | | | | | | |
|---|---|---|---|---|---|---|
| R7  | 5.8992E+01  |  2.3562E-02 | -1.9964E-02 | -1.5178E-01 |  8.1961E-02 | -2.4359E-02 |
| R8  | 4.0760E+00  | -3.7358E-02 | -9.3656E-02 |  3.1213E-02 | -9.4229E-02 | -9.5219E-03 |
| R9  | 1.8838E+00  | -4.2078E-02 |  9.7755E-03 |  9.0700E-03 |  9.4285E-02 | -1.3742E-01 |
| R10 | 1.3056E+00  | -5.4090E-02 |  8.0048E-02 |  1.0112E-02 | -5.3447E-03 |  2.4568E-03 |
| R11 | 1.0382E+02  | -1.9014E-02 |  9.2844E-03 | -1.4899E-03 | -2.9127E-04 |  2.3861E-04 |
| R12 | -4.8920E+00 | -7.2941E-02 |  3.0980E-02 | -5.6818E-03 |  6.9461E-04 | -6.1049E-05 |

| | Conic coefficient | Aspheric coefficient | | | | |
|---|---|---|---|---|---|---|
| | k | A14 | A16 | A18 | A20 | / |
| R1  |  2.1199E+00 | -2.9324E-05 |  1.1909E-05 | / | / | / |
| R2  | -3.9090E-01 | -5.0172E-04 |  4.2521E-04 | / | / | / |
| R3  | -3.2924E+00 |  1.2359E-03 | -1.2712E-02 | / | / | / |
| R4  |  1.0184E+01 |  4.9710E-02 | -3.1263E-01 | / | / | / |
| R5  | -2.8493E+01 | -1.0723E+00 |  8.6775E-01 | / | / | / |
| R6  |  1.6914E+02 | -7.1400E-01 |  7.3122E-01 | / | / | / |
| R7  |  5.8992E+01 | -4.1824E-02 | -8.2552E-02 | / | / | / |
| R8  |  4.0760E+00 |  1.7830E-03 |  5.5669E-02 | / | / | / |
| R9  |  1.8838E+00 | -1.8300E-01 |  2.5464E-01 | / | / | / |
| R10 |  1.3056E+00 | -3.9504E-03 |  8.5147E-04 | / | / | / |
| R11 |  1.0382E+02 | -7.3826E-05 |  7.8270E-06 | / | / | / |
| R12 | -4.8920E+00 | -9.2216E-08 | -3.7919E-08 | / | / | / |

For convenience, the aspherical surface shown in the following formula (1) is used as the aspherical surface of each lens surface. However, the present disclosure is not limited to the aspheric polynomial form represented by the formula (1).

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} \quad (1),$$

where k is the conic coefficient, A4, A6, A8, A10, A12, A14, A16 are the aspheric coefficients, c is the curvature at the center of the optical surface, r is the vertical distance between the point on the aspheric curve and the optical axis, and z is the aspheric surface depth (the vertical distance between a point on the aspheric surface at a distance r from the optical axis and a tangent plane tangent to the vertex on the optical axis of the aspheric surface).

Table 3 shows free-form surface data of the seventh lens L7 in the camera optical lens 10 according to the first embodiment of the present disclosure.

| | Freeform Surface Coefficient | | | | | |
|---|---|---|---|---|---|---|
| | k | X4Y0 | X2Y2 | X0Y4 | X6Y0 | X4Y2 |
| R13 |  3.47E+01 | -1.1338E-01 | -2.2596E-01 | -1.1357E-01 | -1.0936E-03 | -3.2675E-03 |
| R14 | -5.45E+00 | -5.6764E-02 | -1.1355E-01 | -5.6774E-02 |  1.3483E-02 |  4.0526E-02 |

| | X2Y4 | X0Y6 | X8Y0 | X6Y2 | X4Y4 | X2Y6 |
|---|---|---|---|---|---|---|
| R13 | -3.4108E-03 | -1.0447E-03 |  2.0612E-02 |  8.2419E-02 |  1.2368E-01 |  8.2420E-02 |
| R14 |  4.0483E-02 |  1.3489E-02 | -1.7638E-03 | -7.0476E-03 | -1.0568E-02 | -7.0601E-03 |

| | X0Y8 | X10Y0 | X8Y2 | X6Y4 | X4Y6 | X2Y8 |
|---|---|---|---|---|---|---|
| R13 |  2.0626E-02 | -6.9470E-03 | -3.4742E-02 | -6.9478E-02 | -6.9484E-02 | -3.4735E-02 |
| R14 | -1.7622E-03 |  1.0024E-04 |  5.0098E-04 |  1.0029E-03 |  1.0021E-03 |  5.0054E-04 |

| | X0Y10 | X12Y0 | X10Y2 | X8Y4 | X6Y6 | X4Y8 |
|---|---|---|---|---|---|---|
| R13 | -6.9438E-03 |  2.5745E-04 |  1.5435E-03 |  3.8609E-03 |  5.1469E-03 |  3.8568E-03 |
| R14 |  1.0029E-04 | -6.1885E-07 | -3.7624E-06 | -9.3849E-06 | -1.2509E-05 | -9.3729E-06 |

| | X2Y10 | X0Y12 | X14Y0 | X12Y2 | X10Y4 | X8Y6 |
|---|---|---|---|---|---|---|
| R13 |  1.5450E-03 |  2.5864E-04 |  1.9406E-04 |  1.3583E-03 |  4.0757E-03 |  6.7945E-03 |
| R14 | -3.7392E-06 | -6.2286E-07 | -1.8770E-07 | -1.3189E-06 | -3.9600E-06 | -6.6046E-06 |

| | X6Y8 | X4Y10 | X2Y12 | X0Y14 | X16Y0 | X14Y2 |
|---|---|---|---|---|---|---|
| R13 |  6.7909E-03 |  4.0744E-03 |  1.3583E-03 |  1.9470E-04 | -2.2509E-05 | -1.8000E-04 |
| R14 | -6.5955E-06 | -3.9496E-06 | -1.3106E-06 | -1.8810E-07 |  6.2734E-09 |  5.0111E-08 |

| | X12Y4 | X10Y6 | X8Y8 | X6Y10 | X4Y12 | X2Y14 |
|---|---|---|---|---|---|---|
| R13 | -6.2972E-04 | -1.2589E-03 | -1.5740E-03 | -1.2605E-03 | -6.2998E-04 | -1.7995E-04 |
| R14 |  1.7566E-07 |  3.5101E-07 |  4.3786E-07 |  3.5328E-07 |  1.7599E-07 |  4.9904E-08 |

-continued

| | Freeform Surface Coefficient | | | | | |
|---|---|---|---|---|---|---|
| | X0Y16 | X18Y0 | X16Y2 | X14Y4 | X0Y2 | X2Y0 |
| R13 | −2.2893E−05 | / | / | / | −9.8554E−05 | 1.5749E−05 |
| R14 | 6.2872E−09 | / | / | / | −4.5424E−05 | −1.8461E−04 |

$$z = \frac{cr^2}{1 + \sqrt{1-(1+k)c^2 r^2}} + \sum_{i=1}^{N} B_i E_i(x, y), \quad (2)$$

where k is the conic coefficient, Bi is the aspheric coefficient, r is the vertical distance between the point on the free-form surface and the optical axis, x is the x-direction component of r, y is the y-direction component of r, and z is the aspheric depth (the vertical distance between a point on the aspheric surface at a distance r from the optical axis and a tangent plane tangent to the vertex on the optical axis of the aspheric surface).

For convenience, each free-form surface uses the Extended Polynomial shown in Equation (2) above. However, the present disclosure is not limited to the free-form surface polynomial form represented by the formula (2).

Figure 2:
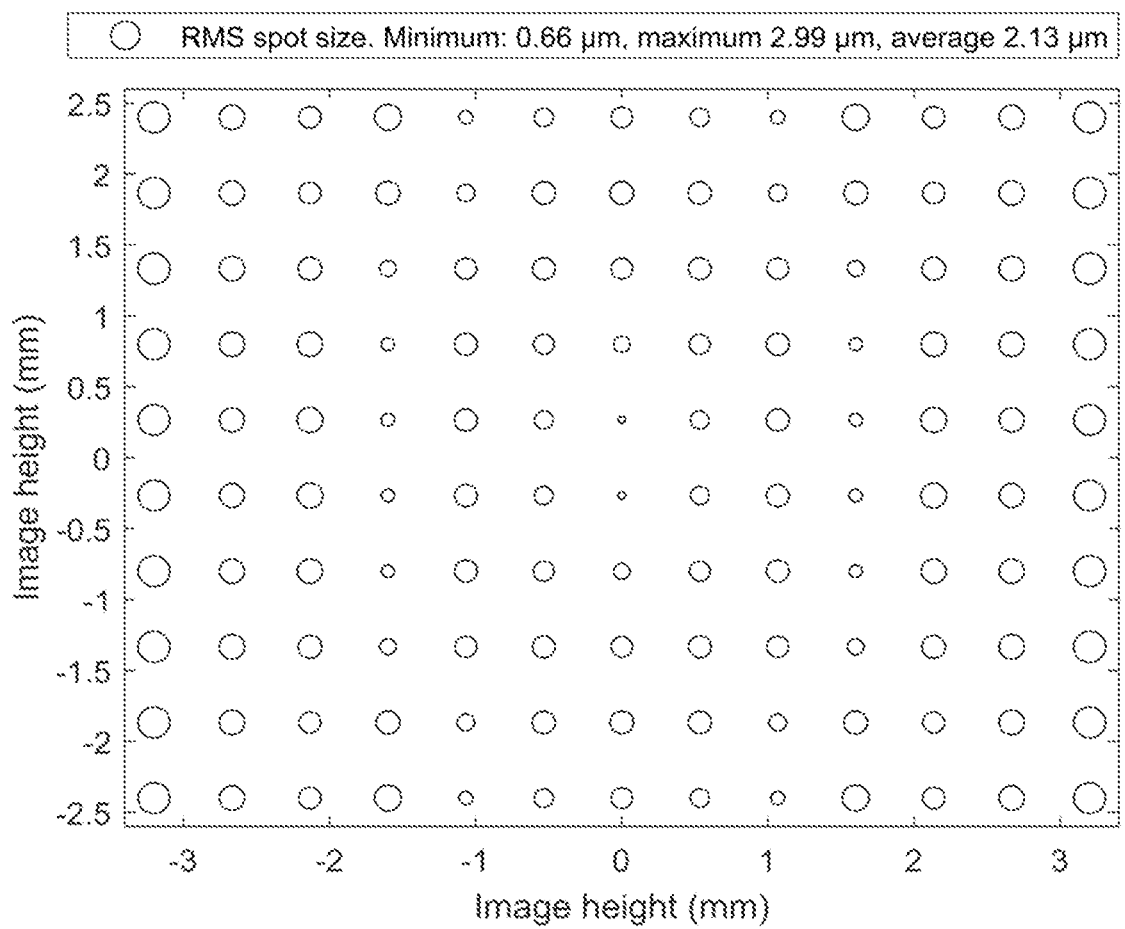
FIG. 2 is a schematic diagram of an RMS spot diameter of the camera optical lens shown in FIG. 1.
Figure 3:
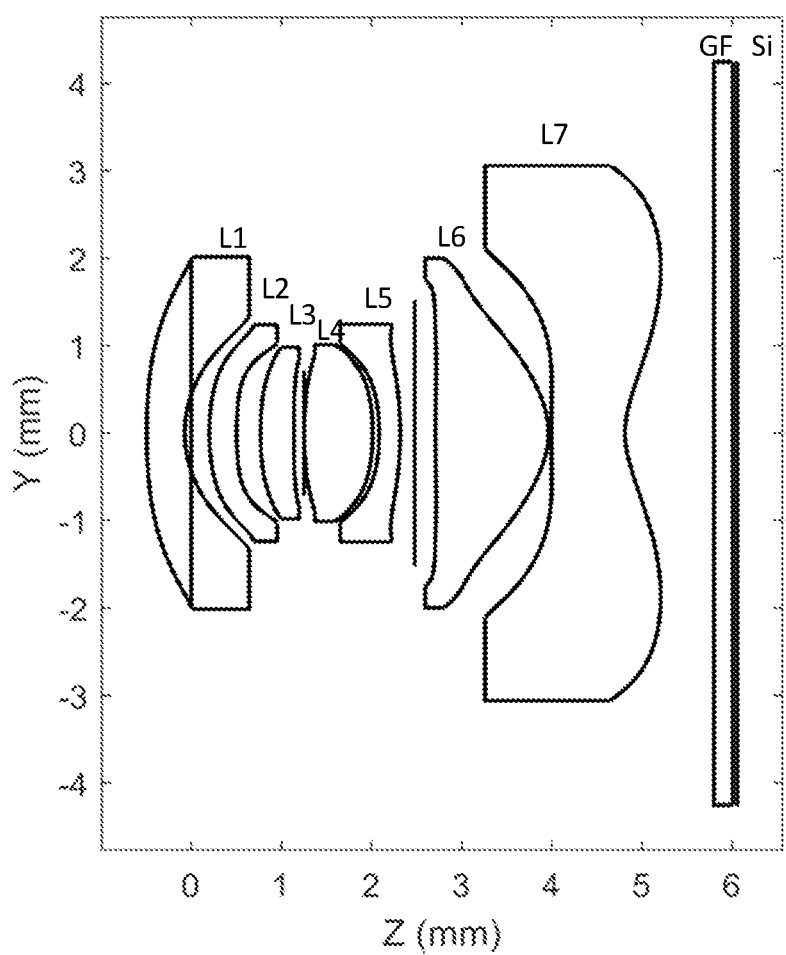
FIG. 3 is a schematic structural diagram of a camera optical lens according to a second embodiment of the present disclosure.

FIG. 2 shows a schematic diagram of the RMS spot diameter of the camera optical lens 10 of the first embodiment. It can be seen from FIG. 2 that the camera optical lens 10 of the first embodiment can achieve good imaging quality.

The following Table 13 shows the values corresponding to the various numerical values in each of Examples 1, 2, 3, and 4 and the parameters specified in the relational expressions.

As shown in Table 13, the first embodiment satisfies each relational expression.

In this embodiment, the entrance pupil diameter ENPD of the camera optical lens is 1.204 mm, the full field of view image height (diagonal direction) IH is 8.114 mm, the image height in the x direction is 6.496 mm, and the image height in the y direction is 4.861 mm, the imaging effect is the best within this rectangular range. The FOV in the diagonal direction is 119.60°, the field of view in the x direction is 106.10°, and the field of view in the y direction is 89.90°. The camera optical lens 10 is wide-angle, ultra-thin, with low distortion, and its on-axis and off-axis chromatic aberrations are fully corrected, and thus the optical lens 10 has excellent optical characteristics.

Second Embodiment

The second embodiment is basically the same as the first embodiment, the meanings of symbols are the same as those of the first embodiment, and only the differences are listed below.

In the present embodiment, the object side surface of the sixth lens L6 is a convex surface at the paraxial position.

Figure 5:
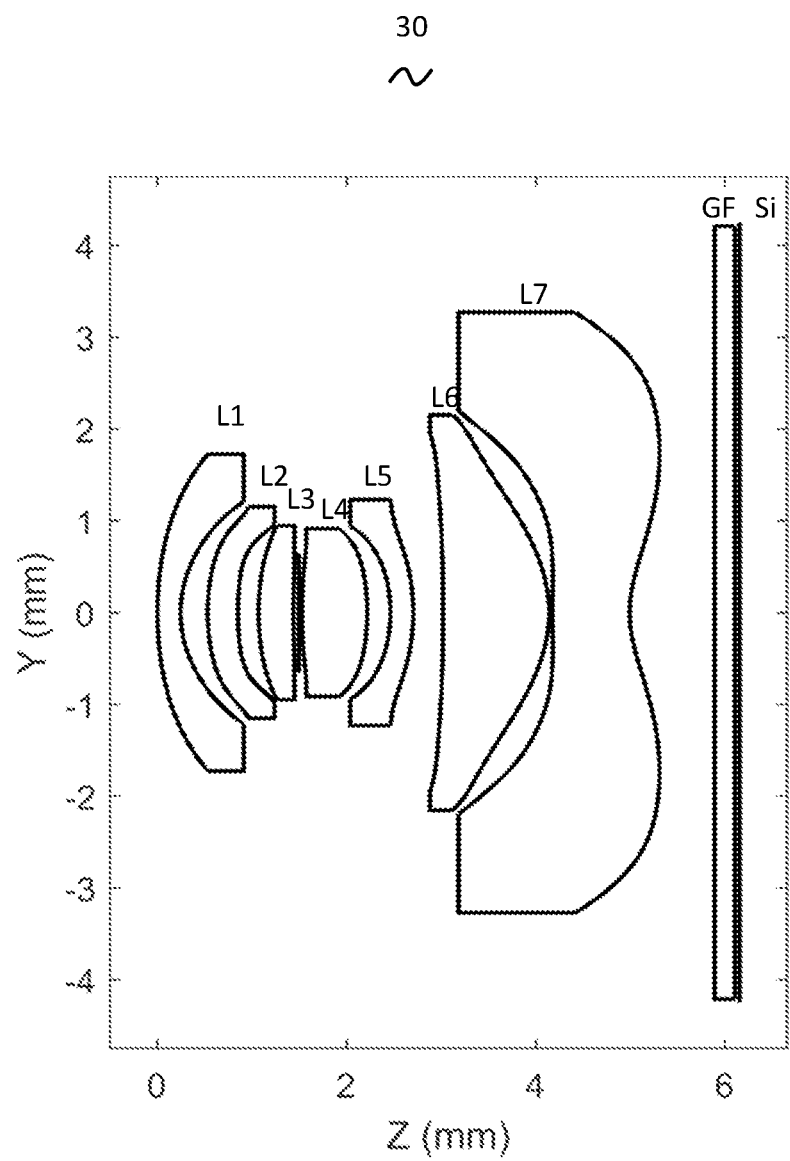
FIG. 5 is a schematic structural diagram of a camera optical lens according to a third embodiment of the present disclosure.

FIG. 5 shows a camera optical lens 20 according to the second embodiment of the present disclosure.

Table 4, Table 5, and Table 6 show design data of the camera optical lens 20 according to the second embodiment of the present disclosure.

TABLE 4

| | R | | d | | nd | | vd |
|---|---|---|---|---|---|---|---|
| S1 | ∞ | d0 = | −0.493 | | / | | / |
| R1 | 7.625 | d1 = | 0.421 | nd1 | 1.5308 | v1 | 55.79 |
| R2 | 1.355 | d2 = | 0.273 | | | | |
| R3 | 2.579 | d3 = | 0.305 | nd2 | 1.6359 | v2 | 23.82 |
| R4 | 5.449 | d4 = | 0.264 | | | | |
| R5 | 4.035 | d5 = | 0.369 | nd3 | 1.5835 | v3 | 30.27 |
| R6 | 32.394 | d6 = | 0.112 | | | | |
| S2 | ∞ | | 0.004 | | | | |
| R7 | 5.655 | d7 = | 0.758 | nd4 | 1.5308 | v4 | 55.79 |
| R8 | −2.597 | d8 = | 0.073 | | | | |
| R9 | −2.431 | d9 = | 0.232 | nd5 | 1.6400 | v5 | 23.54 |
| R10 | −4.620 | d10 = | 0.162 | | | | |
| S3 | ∞ | / | 0.230 | / | / | / | / |
| R11 | 26.622 | d11 = | 1.252 | nd6 | 1.5346 | v6 | 55.69 |
| R12 | −1.017 | d12 = | 0.030 | | | | |
| R13 | 3.03E+01 | d13 = | 8.19E−01 | nd7 | 1.6153 | v7 | 25.94 |
| R14 | 0.957 | d14 = | 0.985 | | | | |
| R15 | ∞ | d15 = | 0.210 | ndg | 1.5168 | vg | 64.17 |
| R16 | ∞ | d16 = | 0.050 | | | | |

Table 5 shows aspherical surface data of the first lens L1 to the sixth lens L6 in the camera optical lens 20 according to the second embodiment of the present disclosure.

TABLE 5

| | Conic coefficient | Aspheric coefficient | | | | |
|---|---|---|---|---|---|---|
| | k | A2 | A4 | A6 | A8 | A10 |
| R1 | 5.1780E+00 | 0.0000E+00 | 3.1865E−02 | −9.2215E−03 | 2.0457E−03 | 1.1754E−04 |
| R2 | −1.2844E−01 | 0.0000E+00 | −1.7174E−02 | 8.3527E−03 | 1.4241E−02 | −1.5789E−02 |
| R3 | −1.6827E+00 | 0.0000E+00 | 1.9704E−02 | 1.4714E−01 | −1.4415E−02 | −4.0924E−02 |
| R4 | −8.9003E+01 | 5.7470E−03 | 2.1538E−01 | 2.0207E−01 | −6.1476E−02 | 1.8092E−02 |
| R5 | −2.1691E+01 | 0.0000E+00 | 1.6599E−01 | 7.5536E−02 | −3.4678E−01 | 4.7658E−01 |
| R6 | 9.5899E+02 | 0.0000E+00 | 1.2206E−01 | −1.5712E−01 | 3.2151E−01 | −2.4059E−01 |
| R7 | 2.2238E+01 | 0.0000E+00 | 1.0461E−01 | −1.3434E−01 | 3.0104E−01 | −3.2415E−01 |
| R8 | 5.0488E+00 | 0.0000E+00 | −5.1649E−02 | −2.8291E−01 | 3.5048E−01 | 6.0689E−02 |
| R9 | 4.4892E+00 | 0.0000E+00 | −8.5282E−02 | −1.4468E−01 | 2.4049E−01 | −3.3503E−01 |
| R10 | 3.4876E+00 | 0.0000E+00 | −3.3532E−02 | 3.8814E−02 | 1.6074E−02 | −9.1492E−03 |

TABLE 5-continued

| | | | | | |
|---|---|---|---|---|---|
| R11 | −6.6088E+03 | 1.6574E−03 | 7.8884E−03 | −3.2120E−02 | 2.2810E−02 −4.2552E−03 |
| R12 | −3.8261E+00 | −3.4443E−02 | −6.2593E−02 | 2.8952E−02 | −1.2462E−02 1.0937E−03 |

| | Conic coefficient | Aspheric coefficient | | | | |
|---|---|---|---|---|---|---|
| | k | A12 | A14 | A16 | A18 | A20 |
| R1 | 5.1780E+00 | −4.5172E−05 | −9.9049E−07 | 1.5432E−06 | −6.8577E−08 | / |
| R2 | −1.2844E−01 | −4.6014E−03 | −8.1886E−04 | 1.2399E−03 | −1.3084E−04 | / |
| R3 | −1.6827E+00 | 3.7442E−03 | 8.7346E−03 | −5.4288E−03 | / | / |
| R4 | −8.9003E+01 | 9.9421E−02 | −6.1118E−02 | −6.0158E−02 | / | / |
| R5 | −2.1691E+01 | 9.4979E−02 | −1.0392E+00 | 7.8597E−01 | −4.2342E−02 | / |
| R6 | 9.5899E+02 | −2.3952E−01 | −3.4873E−01 | 1.1508E+00 | −6.0136E−02 | / |
| R7 | 2.2238E+01 | −5.2929E−01 | 1.4047E+00 | −8.6503E−01 | 3.3915E−02 | / |
| R8 | 5.0488E+00 | −1.1861E+00 | 1.8207E+00 | −8.2817E−01 | 2.5156E−03 | / |
| R9 | 4.4892E+00 | 8.8411E−02 | 4.5305E−01 | −3.1530E−01 | 1.1988E−02 | / |
| R10 | 3.4876E+00 | −2.8298E−03 | 9.1480E−03 | −4.1833E−03 | −2.8149E−05 | / |
| R11 | −6.6088E+03 | −2.0158E−03 | 1.1317E−03 | −1.7332E−04 | / | / |
| R12 | −3.8261E+00 | 2.8388E−03 | −1.0818E−03 | 1.0948E−04 | / | / |

Table 6 shows free-form surface data of the seventh lens L7 in the camera optical lens 20 according to the second embodiment of the present disclosure.

TABLE 6

Freeform Surface Coefficient

| | k | X4Y0 | X2Y2 | X0Y4 | X6Y0 | X4Y2 |
|---|---|---|---|---|---|---|
| R13 | −8.3985E+05 | −6.3632E−02 | −1.2237E−01 | −6.0538E−02 | −1.1995E−02 | −4.4189E−02 |
| R14 | −4.6817E+00 | −2.9631E−02 | −5.4017E−02 | −2.2870E−02 | 5.5627E−03 | 1.2956E−02 |

| | X2Y4 | X0Y6 | X8Y0 | X6Y2 | X4Y4 | X2Y6 |
|---|---|---|---|---|---|---|
| R13 | −4.0250E−02 | −1.4045E−02 | 1.1528E−02 | 5.1979E−02 | 7.7234E−02 | 4.3900E−02 |
| R14 | 9.9128E−03 | 6.9676E−05 | −6.3014E−04 | −1.7570E−03 | 4.1361E−03 | −2.2450E−03 |

| | X0Y8 | X10Y0 | X8Y2 | X6Y4 | X4Y6 | X2Y8 |
|---|---|---|---|---|---|---|
| R13 | 1.2082E−02 | −2.9086E−03 | −1.5662E−02 | −2.1429E−02 | −3.0736E−02 | −1.2205E−02 |
| R14 | 2.1676E−03 | 9.2728E−06 | −4.2751E−06 | −1.9349E−03 | −2.5820E−03 | 7.7834E−04 |

| | X0Y10 | X12Y0 | X10Y2 | X8Y4 | X6Y6 | X4Y8 |
|---|---|---|---|---|---|---|
| R13 | −2.3372E−03 | 2.7178E−04 | 2.0088E−04 | −2.7884E−03 | −6.6426E−03 | 4.9468E−03 |
| R14 | −7.5439E−04 | 6.5043E−06 | 3.0693E−06 | 3.6864E−04 | 7.7159E−04 | 3.5422E−04 |

| | X2Y10 | X0Y12 | X14Y0 | X12Y2 | X10Y4 | X8Y6 |
|---|---|---|---|---|---|---|
| R13 | 1.6608E−04 | −2.5496E−04 | −1.3443E−05 | 6.3140E−04 | 1.6520E−03 | 6.0675E−03 |
| R14 | −2.1089E−04 | 1.0206E−04 | −8.0958E−07 | 2.1431E−06 | −3.4437E−05 | −8.4718E−05 |

| | X6Y8 | X4Y10 | X2Y12 | X0Y14 | X16Y0 | X14Y2 |
|---|---|---|---|---|---|---|
| R13 | 6.7909E−03 | 4.0744E−03 | 3.6864E−04 | 9.8542E−05 | 2.0804E−06 | −7.6555E−05 |
| R14 | −6.5955E−06 | −3.9496E−06 | 2.8142E−05 | −5.2346E−06 | 3.0277E−08 | −1.8549E−07 |

| | X12Y4 | X10Y6 | X8Y8 | X6Y10 | X4Y12 | X2Y14 |
|---|---|---|---|---|---|---|
| R13 | −1.3369E−04 | −7.6390E−04 | −7.2326E−04 | −1.5780E−04 | −8.1200E−05 | 3.5599E−05 |
| R14 | 1.1953E−06 | 3.5020E−06 | 5.0789E−06 | 3.0307E−06 | −1.6036E−06 | −1.3499E−06 |

| | X0Y16 | X18Y0 | X16Y2 | X14Y4 | X0Y2 | X2Y0 |
|---|---|---|---|---|---|---|
| R13 | −3.5488E−06 | / | / | / | 3.5453E−02 | 3.7245E−02 |
| R14 | −1.4567E−08 | / | / | / | −4.7142E−02 | −4.2620E−02 |

Figure 4:
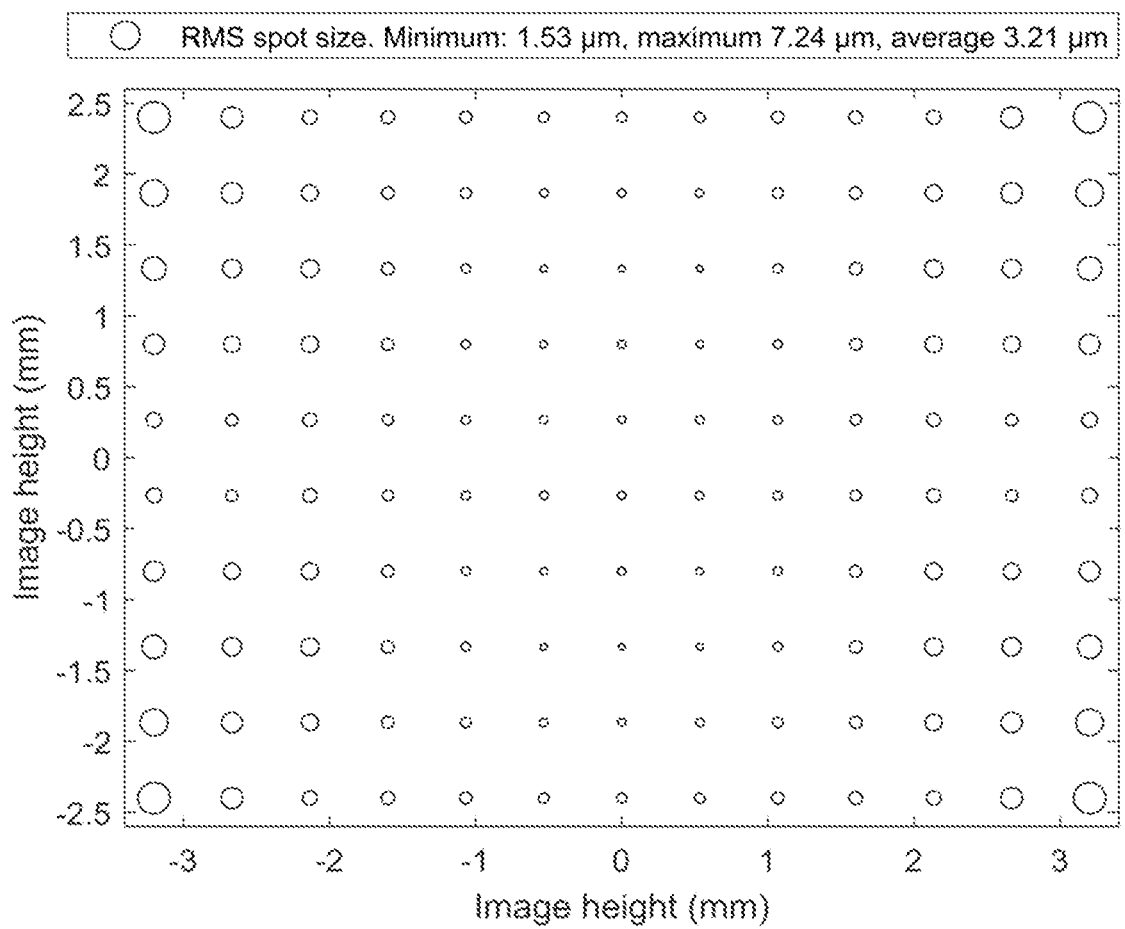
FIG. 4 is a schematic diagram of an RMS spot diameter of the camera optical lens shown in FIG. 3.

FIG. 4 shows a schematic diagram of the RMS spot diameter of the camera optical lens 20 of the second embodiment. It can be seen from FIG. 4 that the camera optical lens 20 of the second embodiment can achieve good imaging quality.

As shown in Table 13, the second embodiment satisfies each relational expression.

In this embodiment, the entrance pupil diameter ENPD of the camera optical lens 20 is 1.264 mm, the full field of view image height (diagonal direction) IH is 8.114 mm, the image height in the x direction is 6.496 mm, and the image height in the y direction is 4.861 mm, and the imaging effect is the best in this rectangular range. The FOV in the diagonal direction is 120.40°, the field of view in the x direction is 106.80°, and the field of view in the y direction is 91.30°. The camera optical lens 20 is wide-angle, ultra-thin, with low-distortion, and its on-axis and off-axis chromatic aberrations are fully corrected, and thus the optical lens 20 has excellent optical characteristics.

Third Embodiment

The third embodiment is basically the same as the first embodiment, the meanings of symbols are the same as those of the first embodiment, and only the differences are listed below.

Table 7, Table 8, and Table 9 show design data of the camera optical lens 30 according to the third embodiment of the present disclosure.

TABLE 7

|     | R       | d      |     | nd     |     | vd    |
|-----|---------|--------|-----|--------|-----|-------|
| S1  | ∞       | d0 =   | 0.000 |      |     |       |
| R1  | 3.987   | d1 =   | 0.244 | nd1  | 1.5444 | v1 | 56.43 |
| R2  | 1.283   | d2 =   | 0.286 |      |     |       |
| R3  | 2.357   | d3 =   | 0.322 | nd2  | 1.6359 | v2 | 23.82 |
| R4  | 4.446   | d4 =   | 0.218 |      |     |       |
| R5  | 3.426   | d5 =   | 0.369 | nd3  | 1.5661 | v3 | 37.71 |
| R6  | 19.890  | d6 =   | 0.055 |      |     |       |
| S2  | ∞       | /      | 0.036 | /    | /    | /  | /   |
| R7  | 6.806   | d7 =   | 0.688 | nd4  | 1.5444 | v4 | 56.43 |
| R8  | −2.594  | d8 =   | 0.245 |      |     |       |
| R9  | −1.676  | d9 =   | 0.241 | nd5  | 1.6700 | v5 | 19.39 |
| R10 | −2.409  | d10 =  | 0.314 |      |     |       |
| R11 | −42.316 | d11 =  | 1.122 | nd6  | 1.8061 | v6 | 40.90 |
| R12 | −1.465  | d12 =  | 0.035 |      |     |       |
| R13 | 13.306  | d13 =  | 0.815 | nd7  | 1.6610 | v7 | 20.53 |
| R14 | 1.279   | d14 =  | 0.903 |      |     |       |
| R15 | ∞       | d15 =  | 0.210 | ndg  | 1.5168 | vg | 64.17 |
| R16 | ∞       | d16 =  | 0.050 |      |     |       |

Table 8 shows aspherical surface data of the first lens L1 to the sixth lens L6 in the camera optical lens 30 according to the third embodiment of the present disclosure.

TABLE 8

| | Conic coefficient | Aspheric coefficient | | | | |
|---|---|---|---|---|---|---|
| | k | A4 | A6 | A8 | A10 | A12 |
| R1  | 2.1154E+00  | 1.6533E−02  | −6.7170E−03 | 2.0555E−03  | 1.0763E−04  | −1.2906E−04 |
| R2  | −3.8963E−01 | −2.2251E−02 | −7.6981E−03 | 2.0416E−02  | −1.3576E−03 | −3.1738E−03 |
| R3  | −3.3077E+00 | 2.2729E−02  | 1.5968E−01  | −4.6796E−02 | −3.0093E−01 | 6.7197E−03  |
| R4  | 1.0212E+01  | 1.4601E−01  | 2.7608E−01  | −5.5164E−02 | −4.0747E−02 | 1.9252E−01  |
| R5  | −2.8509E+01 | 1.8515E−01  | 4.9105E−02  | −4.6307E−01 | 6.9104E−01  | −8.0353E−02 |
| R6  | 1.8494E+02  | 3.7342E−02  | −1.4237E−01 | 2.8864E−01  | −7.0465E−01 | 8.0057E−01  |
| R7  | 5.8851E+01  | 2.3428E−02  | −1.9863E−02 | −1.5218E−01 | 8.5551E−02  | −2.0820E−02 |
| R8  | 4.0684E+00  | −3.7392E−02 | −9.4056E−02 | 3.1730E−02  | −9.5278E−02 | −9.8049E−03 |
| R9  | 1.8840E+00  | −4.2227E−02 | 9.5166E−03  | 8.4817E−03  | 9.4767E−02  | −1.3989E−01 |
| R10 | 1.3068E+00  | −5.4335E−02 | 8.0567E−02  | 1.0208E−02  | −5.4086E−03 | 2.4934E−03  |
| R11 | 4.9107E+01  | −1.9069E−02 | 9.3443E−03  | −1.5055E−03 | −2.9443E−04 | 2.4234E−04  |
| R12 | −4.8805E+00 | −7.3249E−02 | 3.1152E−02  | −5.7384E−03 | 7.0266E−04  | −6.1932E−05 |

| | Conic coefficient | Aspheric coefficient | | | | |
|---|---|---|---|---|---|---|
| | k | A14 | A16 | A18 | A20 | / |
| R1  | 2.1154E+00  | −2.9848E−05 | 1.2122E−05  | / | / | / |
| R2  | −3.8963E−01 | −5.1846E−04 | 4.3157E−04  | / | / | / |
| R3  | −3.3077E+00 | 1.2531E−03  | −1.2970E−02 | / | / | / |
| R4  | 1.0212E+01  | 5.1031E−02  | −3.1824E−01 | / | / | / |
| R5  | −2.8509E+01 | −1.0913E+00 | 8.8421E−01  | / | / | / |
| R6  | 1.8494E+02  | −7.2908E−01 | 7.4914E−01  | / | / | / |
| R7  | 5.8851E+01  | −4.0557E−02 | −9.2996E−02 | / | / | / |
| R8  | 4.0684E+00  | 1.6804E−03  | 5.7276E−02  | / | / | / |
| R9  | 1.8840E+00  | −1.8626E−01 | 2.6023E−01  | / | / | / |
| R10 | 1.3068E+00  | −4.0169E−03 | 8.7193E−04  | / | / | / |
| R11 | 4.9107E+01  | −7.5066E−05 | 7.9907E−06  | / | / | / |
| R12 | −4.8805E+00 | −8.7377E−08 | −3.6904E−08 | / | / | / |

Table 9 shows free-form surface data of the seventh lens L7 in the camera optical lens 30 according to the third embodiment of the present disclosure.

TABLE 9

| | Freeform Surface Coefficient | | | | | |
|---|---|---|---|---|---|---|
| | k | X4Y0 | X2Y2 | X0Y4 | X6Y0 | X4Y2 |
| R13 | 3.47E+01  | −1.1399E−01 | −2.2632E−01 | −1.1437E−01 | −1.0496E−03 | −3.3336E−03 |
| R14 | −5.40E+00 | −5.7029E−02 | −1.1376E−01 | −5.7123E−02 | 1.3570E−02  | 4.0826E−02  |

| | X2Y4 | X0Y6 | X8Y0 | X6Y2 | X4Y4 | X2Y6 |
|---|---|---|---|---|---|---|
| R13 | −3.4155E−03 | −9.9293E−04 | 2.0811E−02  | 8.3185E−02  | 1.2477E−01  | 8.3209E−02  |
| R14 | 4.0764E−02  | 1.3546E−02  | −1.7797E−03 | −7.1142E−03 | −1.0664E−02 | −7.1232E−03 |

TABLE 9-continued

| | Freeform Surface Coefficient | | | | |
|---|---|---|---|---|---|
| | X0Y8 | X10Y0 | X8Y2 | X6Y4 | X4Y6 | X2Y8 |
| R13 | 2.0834E−02 | −7.0311E−03 | −3.5175E−02 | −7.0315E−02 | −7.0330E−02 | −3.5161E−02 |
| R14 | −1.7818E−03 | 1.0143E−04 | 5.0681E−04 | 1.0147E−03 | 1.0138E−03 | 5.0662E−04 |

| | X0Y10 | X12Y0 | X10Y2 | X8Y4 | X6Y6 | X4Y8 |
|---|---|---|---|---|---|---|
| R13 | −7.0231E−03 | 2.6106E−04 | 1.5647E−03 | 3.9177E−03 | 5.2233E−03 | 3.9091E−03 |
| R14 | 1.0135E−04 | −6.2727E−07 | −3.8423E−06 | −9.5267E−06 | −1.2747E−05 | −9.5384E−06 |

| | X2Y10 | X0Y12 | X14Y0 | X12Y2 | X10Y4 | X8Y6 |
|---|---|---|---|---|---|---|
| R13 | 1.5658E−03 | 2.6329E−04 | 1.9742E−04 | 1.3815E−03 | 4.1476E−03 | 6.9144E−03 |
| R14 | −3.8107E−06 | −6.0165E−07 | −1.9026E−07 | −1.3429E−06 | −4.0262E−06 | −6.7192E−06 |

| | X6Y8 | X4Y10 | X2Y12 | X0Y14 | X16Y0 | X14Y2 |
|---|---|---|---|---|---|---|
| R13 | 6.9067E−03 | 4.1433E−03 | 1.3823E−03 | 1.9780E−04 | −2.2939E−05 | −1.8368E−04 |
| R14 | −6.7094E−06 | −4.0144E−06 | −1.3321E−06 | −1.7958E−07 | 6.6132E−09 | 5.1362E−08 |

| | X12Y4 | X10Y6 | X8Y8 | X6Y10 | X4Y12 | X2Y14 |
|---|---|---|---|---|---|---|
| R13 | −6.4270E−04 | −1.2836E−03 | −1.6055E−03 | −1.2867E−03 | −6.4314E−04 | −1.8300E−04 |
| R14 | 1.7995E−07 | 3.5763E−07 | 4.4760E−07 | 3.6179E−07 | 1.8277E−07 | 5.4087E−08 |

| | X0Y16 | X18Y0 | X16Y2 | X14Y4 | X0Y2 | X2Y0 |
|---|---|---|---|---|---|---|
| R13 | −2.3253E−05 | / | / | / | −8.2273E−04 | −7.4898E−04 |
| R14 | 9.7159E−09 | / | / | / | −2.1813E−04 | −2.5276E−04 |

Figure 6:
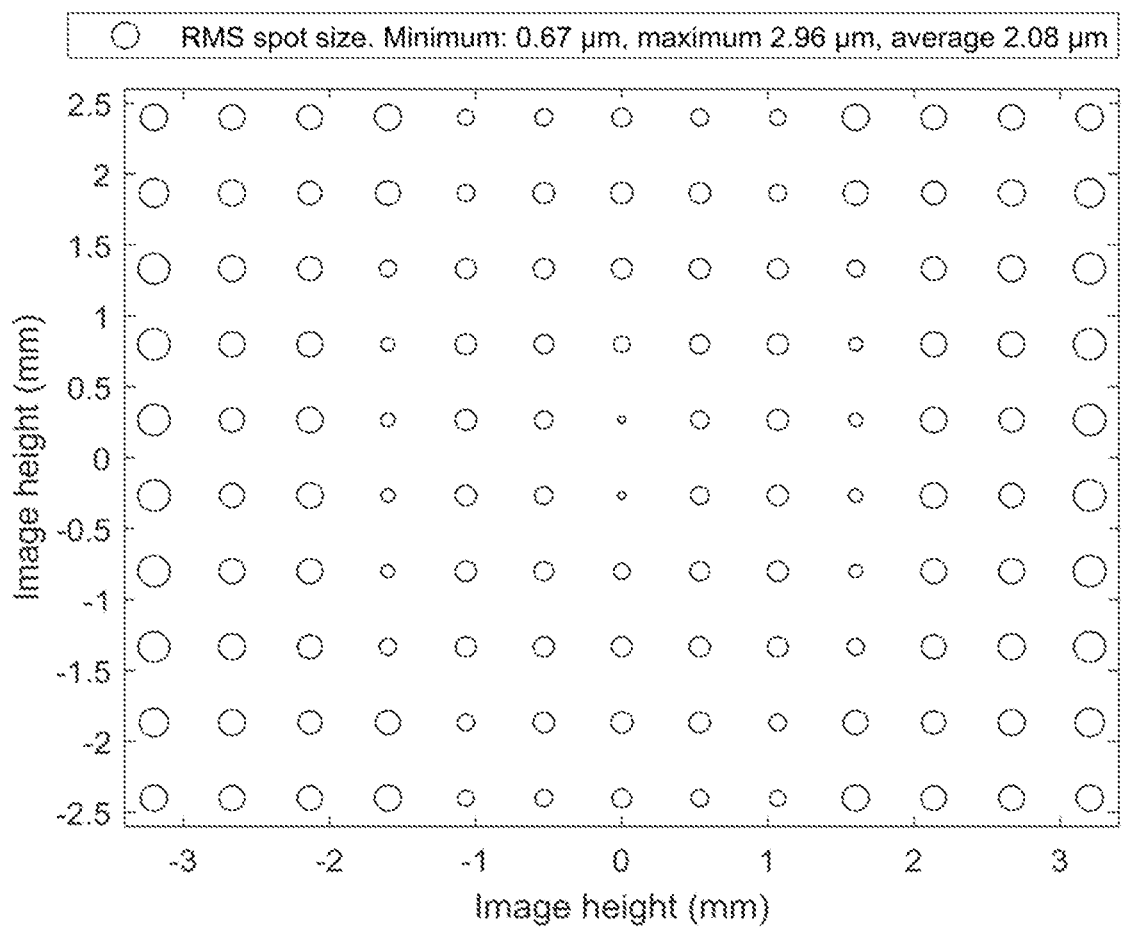
FIG. 6 is a schematic diagram of an RMS spot diameter of the camera optical lens shown in FIG. 5.
Figure 7:
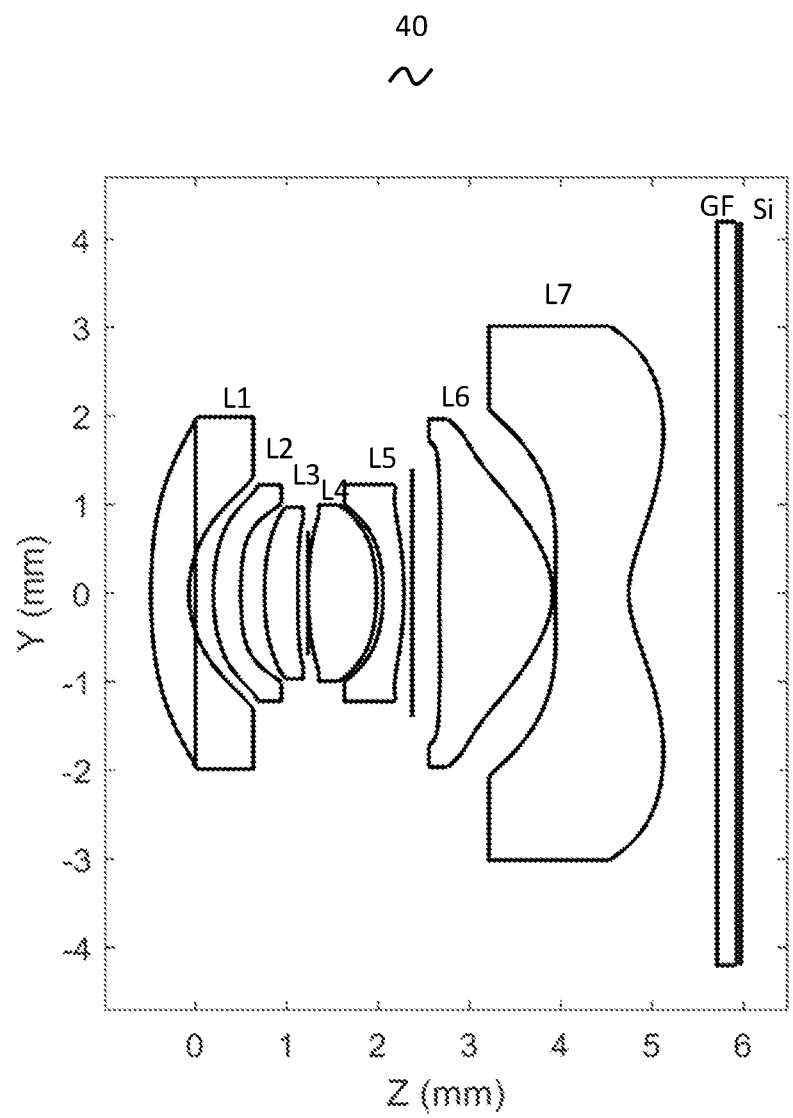
FIG. 7 is a schematic diagram of a camera optical lens according to a fourth embodiment of the present disclosure.

FIG. 6 is a schematic diagram showing the RMS spot diameter of the camera optical lens 30 of the third embodiment. It can be seen from FIG. 6 that the camera optical lens 30 of the third embodiment can achieve good imaging quality.

As shown in Table 13, the third embodiment satisfies each relational expression.

The entrance pupil diameter ENPD of the camera optical lens 30 is 1.203 mm, the full field of view image height (diagonal direction) IH is 8.000 mm, the image height in the x direction is 6.400 mm, and the image height in the y direction is 4.800 mm, the imaging effect is the best within this rectangular range. The FOV in the diagonal direction is 119.60°, the field of view in the x direction is 106.10°, and the field of view in they direction is 90.80°. The camera optical lens 30 is wide-angle, ultra-thin, with low-distortion, and its on-axis and off-axis chromatic aberrations are fully corrected, and thus the optical lens 30 has excellent optical characteristics.

Fourth Embodiment

The fourth embodiment is basically the same as the first embodiment, the meanings of symbols are the same as those of the first embodiment, and only the differences are listed below.

In the present embodiment, the object side surface of the sixth lens L6 is a convex surface at the paraxial position.

Table 10, Table 11, and Table 12 show design data of the camera optical lens 40 according to the fourth embodiment of the present disclosure.

TABLE 10

| | R | d | | nd | | vd | |
|---|---|---|---|---|---|---|---|
| S1 | ∞ | d0 = | −0.487 | / | | / | |
| R1 | 7.513 | d1 = | 0.414 | nd1 | 1.5308 | v1 | 55.79 |
| R2 | 1.335 | d2 = | 0.269 | | | | |
| R3 | 2.540 | d3 = | 0.300 | nd2 | 1.6359 | v2 | 23.82 |
| R4 | 5.368 | d4 = | 0.260 | | | | |
| R5 | 3.975 | d5 = | 0.364 | nd3 | 1.5835 | v3 | 30.27 |
| R6 | 31.915 | d6 = | 0.110 | | | | |
| S2 | ∞ | / | 0.004 | / | / | / | / |
| R7 | 5.572 | d7 = | 0.747 | nd4 | 1.5308 | v4 | 55.79 |
| R8 | −2.558 | d8 = | 0.072 | | | | |
| R9 | −2.395 | d9 = | 0.229 | nd5 | 1.6400 | v5 | 23.54 |
| R10 | −4.551 | d10 = | 0.090 | | | | |
| S3 | ∞ | / | 0.298 | / | / | / | / |
| R11 | 26.229 | d11 = | 1.238 | nd6 | 1.5346 | v6 | 55.69 |
| R12 | −1.002 | d12 = | 0.030 | | | | |
| R13 | 2.98E+01 | d13 = | 8.05E−01 | nd7 | 1.6153 | v7 | 25.94 |
| R14 | 0.943 | d14 = | 0.969 | | | | |
| R15 | ∞ | d15 = | 0.210 | ndg | 1.5168 | vg | 64.17 |
| R16 | ∞ | d16 = | 0.050 | | | | |

Table 11 shows aspherical surface data of the first lens L1 to the sixth lens L6 in the camera optical lens 40 according to the fourth embodiment of the present disclosure.

TABLE 11

| | Conic coefficient | Aspheric coefficient | | | | |
|---|---|---|---|---|---|---|
| | k | A2 | A4 | A6 | A8 | A10 |
| R1 | 5.1780E+00 | 0.0000E+00 | 3.1393E−02 | −9.0851E−03 | 2.0154E−03 | −1.1580E−04 |
| R2 | −1.2844E−01 | 0.0000E+00 | −1.6920E−02 | 8.2292E−03 | 1.4031E−02 | −1.5555E−02 |

TABLE 11-continued

| | | | | | | |
|---|---|---|---|---|---|---|
| R3  | −1.6827E+00 | 0.0000E+00 | 2.0605E−02 | 1.5852E−01 | −1.6000E−02 | −4.6797E−02 |
| R4  | −8.9003E+01 | 5.8333E−03 | 2.2523E−01 | 2.1770E−01 | −6.8234E−02 | 2.0688E−02 |
| R5  | −2.1691E+01 | 0.0000E+00 | 1.6354E−01 | 7.4419E−02 | −3.4165E−01 | 4.6954E−01 |
| R6  | 9.5899E+02 | 0.0000E+00 | 1.2025E−01 | −1.5479E−01 | 3.1675E−01 | −2.3703E−01 |
| R7  | 2.2238E+01 | 0.0000E+00 | 1.0307E−01 | −1.3235E−01 | 2.9659E−01 | −3.1935E−01 |
| R8  | 5.0488E+00 | 0.0000E+00 | −5.0885E−02 | −2.7872E−01 | 3.4530E−01 | 5.9791E−02 |
| R9  | 4.4892E+00 | 0.0000E+00 | −8.4020E−02 | −1.4254E−01 | 2.3694E−01 | −3.3007E−01 |
| R10 | 3.4876E+00 | 0.0000E+00 | −3.3036E−02 | 3.8240E−02 | 1.5836E−02 | −9.0139E−03 |
| R11 | −6.6088E+03 | 3.6188E−03 | 6.6119E−03 | −3.4085E−02 | 2.5215E−02 | −4.9030E−03 |
| R12 | −3.8261E+00 | −3.7502E−02 | −6.5491E−02 | 3.0964E−02 | −1.3699E−02 | 1.2267E−03 |

| | Conic coefficient | Aspheric coefficient | | | | |
|---|---|---|---|---|---|---|
| | k | A12 | A14 | A16 | A18 | A20 |
| R1  | 5.1780E+00 | −4.4504E−05 | −9.7584E−07 | 1.5203E−06 | −6.7563E−08 | / |
| R2  | −1.2844E−01 | −4.5333E−03 | −8.0675E−04 | 1.2216E−03 | −1.2891E−04 | / |
| R3  | −1.6827E+00 | 4.4111E−03 | 1.0602E−02 | −6.7885E−03 | / | / |
| R4  | −8.9003E+01 | 1.1713E−01 | −7.4181E−02 | −7.5225E−02 | / | / |
| R5  | −2.1691E+01 | 9.3574E−02 | −1.0238E+00 | 7.7434E−01 | −4.1715E−02 | / |
| R6  | 9.5899E+02 | −2.3598E−01 | −3.4357E−01 | 1.1337E+00 | −5.9246E−02 | / |
| R7  | 2.2238E+01 | −5.2146E−01 | 1.3840E+00 | −8.5223E−01 | 3.3414E−02 | / |
| R8  | 5.0488E+00 | −1.1686E+00 | 1.7937E+00 | −8.1592E−01 | 2.4784E−03 | / |
| R9  | 4.4892E+00 | 8.7104E−02 | 4.4634E−01 | −3.1064E−01 | 1.1811E−02 | / |
| R10 | 3.4876E+00 | −2.7879E−03 | 9.0127E−03 | −4.1215E−03 | −2.7733E−05 | / |
| R11 | −6.6088E+03 | −2.3715E−03 | 1.3762E−03 | 2.1699E−04 | / | / |
| R12 | −3.8261E+00 | 3.3373E−03 | −1.3126E−03 | 1.3728E−04 | / | / |

Table 12 shows free-form surface data of the seventh lens L7 in the camera optical lens 40 according to the fourth embodiment of the present disclosure.

TABLE 12

Freeform Surface Coefficient

| | k | X4Y0 | X2Y2 | X0Y4 | X6Y0 | X4Y2 |
|---|---|---|---|---|---|---|
| R13 | −8.3985E+05 | −6.4692E−02 | −1.2438E−01 | −6.1848E−02 | −1.0537E−02 | −4.0811E−02 |
| R14 | −4.6817E+00 | −2.9431E−02 | −5.4533E−02 | −2.3424E−02 | 5.4936E−03 | 1.2691E−02 |

| | X2Y4 | X0Y6 | X8Y0 | X6Y2 | X4Y4 | X2Y6 |
|---|---|---|---|---|---|---|
| R13 | −3.7343E−02 | −1.2834E−02 | 1.1254E−02 | 5.0918E−02 | 7.6610E−02 | 4.3423E−02 |
| R14 | 9.9803E−03 | 2.0422E−04 | −6.1613E−04 | −1.6617E−03 | 3.9777E−03 | −2.0676E−03 |

| | X0Y8 | X10Y0 | X8Y2 | X6Y4 | X4Y6 | X2Y8 |
|---|---|---|---|---|---|---|
| R13 | 1.1818E−02 | −2.8897E−03 | −1.5456E−02 | −2.1165E−02 | −3.0748E−02 | −1.1935E−02 |
| R14 | 2.1298E−03 | 8.6319E−06 | −9.8223E−07 | −1.9112E−03 | −2.5371E−03 | 7.6704E−04 |

| | X0Y10 | X12Y0 | X10Y2 | X8Y4 | X6Y6 | X4Y8 |
|---|---|---|---|---|---|---|
| R13 | −2.2805E−03 | 2.6871E−04 | 2.1047E−04 | −2.7740E−03 | −6.5899E−03 | 4.8247E−03 |
| R14 | −7.5199E−04 | 6.3305E−06 | 2.7167E−06 | 3.6336E−04 | 7.5927E−04 | 3.5048E−04 |

| | X2Y10 | X0Y12 | X14Y0 | X12Y2 | X10Y4 | X8Y6 |
|---|---|---|---|---|---|---|
| R13 | 1.2488E−04 | −2.7586E−04 | −1.3015E−05 | 6.2564E−04 | 1.6122E−03 | 5.9748E−03 |
| R14 | −2.1322E−04 | 1.0215E−04 | −7.9428E−07 | 2.0316E−06 | −3.3924E−05 | −8.3524E−05 |

| | X6Y8 | X4Y10 | X2Y12 | X0Y14 | X16Y0 | X14Y2 |
|---|---|---|---|---|---|---|
| R13 | 2.4082E−03 | 1.2695E−04 | 3.4395E−04 | 1.0911E−04 | 2.1236E−06 | −7.6470E−05 |
| R14 | −8.9716E−05 | −2.8355E−06 | 2.7135E−05 | −4.9676E−06 | 3.0226E−08 | −1.7801E−07 |

| | X12Y4 | X10Y6 | X8Y8 | X6Y10 | X4Y12 | X2Y14 |
|---|---|---|---|---|---|---|
| R13 | −1.2954E−04 | −7.4856E−04 | −7.0973E−04 | −1.7414E−04 | −7.0622E−05 | −3.1813E−05 |
| R14 | 1.1832E−06 | 3.4512E−06 | 5.0037E−06 | 2.9946E−06 | −1.6581E−06 | −1.1805E−06 |

| | X0Y16 | X18Y0 | X16Y2 | X14Y4 | X0Y2 | X2Y0 |
|---|---|---|---|---|---|---|
| R13 | −5.4906E−06 | / | / | / | 3.0470E−02 | 3.1453E−02 |
| R14 | −5.2908E−08 | / | / | / | −4.7285E−02 | −4.5053E−02 |

Figure 8:
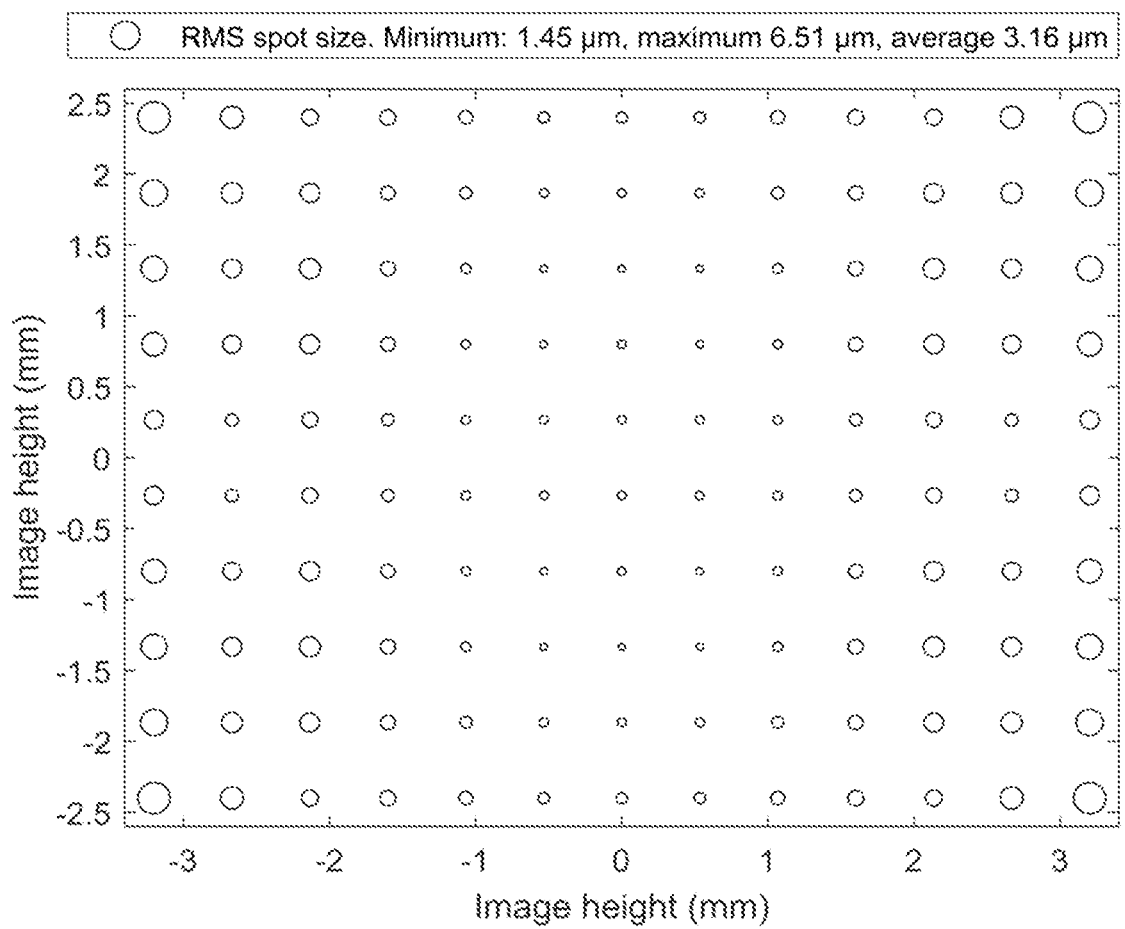
FIG. 8 is a schematic diagram of an RMS spot diameter of the camera optical lens shown in FIG. 7.

FIG. 8 is a schematic diagram showing the RMS spot diameter of the camera optical lens 40 of the fourth embodiment. It can be seen from FIG. 8 that the camera optical lens 40 of the fourth embodiment can achieve good imaging quality.

As shown in Table 13, the fourth embodiment satisfies each relational expression.

The entrance pupil diameter ENPD of the camera optical lens 40 is 1.245 mm, the full field of view image height (diagonal direction) IH is 8.000 mm, the image height in the x direction is 6.400 mm, and the image height in the y direction is 4.800 mm, the imaging effect is the best in this rectangular range. The FOV in the diagonal direction is 120.40°, the field of view in the x direction is 106.90°, and the field of view in the y direction is 91.50°. The camera optical lens 40 satisfies wide-angle, ultra-thin, with low distortion, and its on-axis and off-axis chromatic aberrations are fully corrected, and thus the optical lens 40 has excellent optical characteristics.

The numerical values in Table 13 are numerical values related to the parameters defined by the respective relational expressions in respective embodiments.

TABLE 13

| Parameters and Conditionals | First embodiment | Second Embodiment | Third Embodiment | Fourth Embodiment |
|---|---|---|---|---|
| f1/f | −1.51 | −1.39 | −1.51 | −1.39 |
| n3 | 1.57 | 1.58 | 1.57 | 1.58 |
| n6 | 1.86 | 1.54 | 1.86 | 1.56 |
| n7 | 1.66 | 1.62 | 1.66 | 1.62 |
| f3/f4 | 2.05 | 2.26 | 2.04 | 2.26 |
| f7y/f | −0.925 | −0.867 | −0.917 | −0.855 |
| f7y/f7x | 0.999 | 1.005 | 1.000 | 0.999 |
| (R13 + R14)/(R13 − R14) | 1.21 | 1.06 | 1.21 | 1.06 |
| nd5 | 1.67 | 1.64 | 1.67 | 1.64 |
| f | 2.367 | 2.279 | 2.374 | 2.250 |
| f1 | −3.578 | −3.167 | −3.576 | −3.120 |
| f2 | 7.396 | 7.734 | 7.385 | 7.620 |
| f3 | 7.250 | 7.814 | 7.217 | 7.699 |
| f4 | 3.536 | 3.452 | 3.531 | 3.401 |
| f5 | −9.436 | −8.302 | −9.398 | −8.179 |
| f6 | 1.854 | 1.736 | 1.852 | 1.700 |
| f7 | −2.191 | −1.976 | −2.176 | −1.923 |
| FNO | 1.98 | 1.80 | 1.97 | 1.81 |
| TTL | 6.16 | 6.55 | 6.15 | 6.46 |
| IH | 8.11 | 8.11 | 8.00 | 8.00 |
| FOV | 119.60 | 120.40 | 119.60 | 120.40 |

The meaning of the symbols is as follows.
f: overall focal length of the camera optical lens;
f1: focal length of the first lens L1;
f2: focal length of the second lens L2;
f3: focal length of the third lens L3;
f4: focal length of the fourth lens L5;
f5: focal length of the fifth lens L5;
f6: focal length of the sixth lens L6;
f7: focal length of the seventh lens L7;
f7x: focal length of the seventh lens L7 along X direction;
f7y: focal length of the seventh lens L7 along Y direction;
FNO: F-number of aperture;
TTL: total optical length;
FOV: field of view in diagonal direction;
IH: Full-field image height.

Based on the above embodiments, it can be seen that the camera optical lens of the present disclosure can have a field of view of 120° and a total optical length of less than 6.6 mm, and utilize free-form surfaces to enhance imaging performance, thereby helping to control distortion and allowing the entire sensor area, and thus achieving excellent imaging performance such as clear imaging, achieving ultra-thin, wide-angle, low optical distortion, low SMIA TV distortion, and short track length.

The foregoing descriptions are only preferred embodiments of the present disclosure, and are not intended to limit the present disclosure. For those skilled in the art, the present disclosure can have various modifications and changes. Any modification, equivalent replacement, improvement, etc. made within the spirit and principle of the present disclosure shall be included in the protection scope of the present disclosure.

What is claimed is:

1. A camera optical lens, comprising sequentially from an object side to an image side:
   a first lens having negative refractive power,
   a second lens having positive refractive power,
   a third lens having positive refractive power,
   a fourth lens having positive refractive power,
   a fifth lens having negative refractive power,
   a sixth lens having positive refractive power, and
   a seventh lens having negative refractive power,
   wherein an object side surface and an image side surface of the seventh lens are free-form surfaces, and
   wherein a focal length of the camera optical lens is f; a focal length of the first lens is f1; a focal length of the third lens is f3; a focal length of the fourth lens is f4; a refractive index of the third lens is nd3; a refractive index of the sixth lens is nd6; a refractive index of the seventh lens is nd7, a curvature radius of an object side surface of the seventh lens is R13, a curvature radius of an image side surface of the seventh lens is R14, and f, f1, f3, f4, nd3, nd6, nd7, R13 and R14 satisfy the following relational expressions:

$-1.52 \leq f1/f \leq -1.38$;

$1.56 \leq nd3 \leq 1.59$;

$1.53 \leq nd6 \leq 1.81$;

$1.61 \leq nd7 \leq 1.67$;

$2.04 \leq f3/f4 \leq 2.27$;

$1.06 \leq (R13+R14)/(R13-R14) \leq 1.22$.

2. The camera optical lens according to claim 1, wherein a refractive index of the fifth lens is nd5, and nd5 satisfies the following relational expression:

$1.64 \leq nd5 \leq 1.67$.

3. The camera optical lens according to claim 1, wherein an object side surface of the first lens is convex at a paraxial position, and an image side surface of the first lens is concave at a paraxial position;
   a central radius of curvature of the object side surface of the first lens is R1, a central radius of curvature of the image side surface of the first lens is R2, an on-axis thickness of the first lens is d1, and a total optical length of the camera optical lens is TTL, and R1, R2, d1 and TTL satisfy the following relational expressions:

$1.43 \leq (R1+R2)/(R1-R2) \leq 1.95$;

$0.04 \leq d1/TTL \leq 0.07$.

4. The camera optical lens according to claim 1, wherein an object side surface of the second lens is convex at a paraxial position, and an image side surface of the second lens is concave at a paraxial position;
   a focal length of the second lens is f2, a central radius of curvature of the object side surface of the second lens is R3, a central radius of curvature of the image side surface of the second lens is R4, and an on-axis thickness of the second lens is d3, a total optical length of the camera optical lens is TTL, and f, f2, R3, R4, d3 and TTL satisfy the following relational expressions:

$3.10 \leq f2/f \leq 3.40$;

$-3.26 \leq (R3+R4)/(R3-R4) \leq -2.79$;

$0.04 \leq d3/TTL \leq 0.06$.

5. The camera optical lens according to claim 1, wherein an object side surface of the third lens is convex at a paraxial position, and an image side surface of the third lens is concave at a paraxial position;
   a focal length of the third lens is f3, a central radius of curvature of the object side surface of the third lens is R5, a central radius of curvature of the image side surface of the third lens is R6, and an on-axis thickness of the third lens isd5, a total optical length of the camera optical lens is TTL, and f, f3, R5, R6, d5 and TTL satisfy the following relational expressions:

$3.04 \leq f3/f \leq 3.43$;

$-1.42 \leq (R5+R6)/(R5-R6) \leq -1.28$;

$0.05 \leq d5/TTL \leq 0.06$.

6. The camera optical lens according to claim 1, wherein an object side surface of the fourth lens is convex at a paraxial position, and an image side surface of the fourth lens is convex at a paraxial position;
   a focal length of the fourth lens is f4, a central radius of curvature of the object side surface of the fourth lens is R7, a central radius of curvature of the image side surface of the fourth lens is R8, and an on-axis thickness of the fourth lens isd7, a total optical length of the camera optical lens is TTL, and f, f4, R7, R8, d7 and TTL satisfy the following relational expressions:

$1.48 \leq f4/f \leq 1.52$;

$0.37 \leq (R7+R8)/(R7-R8) \leq 0.45$;

$0.10 \leq d7/TTL \leq 0.12$.

7. The camera optical lens according to claim 1, wherein an object side surface of the fifth lens is concave at a paraxial position, and an image side surface of the fifth lens is convex at a paraxial position;
   a focal length of the fifth lens is f5, a central radius of curvature of the object side surface of the fifth lens is R9, a central radius of curvature of the image side surface of the fifth lens is R10, and an on-axis thickness of the fifth lens isd9, a total optical length of the camera optical lens is TTL, and f, f5, R9, R10, d9 and TTL satisfy the following relational expressions:

$-3.99 \leq f5/f \leq -3.63$;

$-5.59 \leq (R9+R10)/(R9-R10) \leq -3.20$;

$0.03 \leq d9/TTL \leq 0.04$.

8. The camera optical lens according to claim 1, wherein an image side surface of the sixth lens is convex at a paraxial position;
   a focal length of the sixth lens is f6, a central radius of curvature of an object side surface of the sixth lens is R11, a central radius of curvature of the image side surface of the sixth lens is R12, and an on-axis thickness of the sixth lens isd11, a total optical length of the camera optical lens is TTL, and f, f6, R11, R12, d11 and TTL satisfy the following relational expressions:

$0.75 \leq f6/f \leq 0.79$;

$0.92 \leq (R11+R12)/(R11-R12) \leq 1.10$;

$0.18 \leq d11/TTL \leq 0.20$.

9. The camera optical lens according to claim 1, wherein an object side surface of the seventh lens is convex at a paraxial position, and an image side surface of the seventh lens is concave at a paraxial position;
   a focal length of the seventh lens is f7, an on-axis thickness of the seventh lens is d13, a total optical length of the camera optical lens is TTL, and f, f7, d13 and TTL satisfy the following relational expressions:

$-0.95 \leq f7/f \leq -0.85$;

$0.12 \leq d13/TTL \leq 0.14$.

10. The camera optical lens according to claim 1, wherein a focal length in an x-direction of the seventh lens is f7x, a focal length in a y-direction of the seventh lens is f7y, and f7x and f7y satisfy the following relational expressions:

$-0.93 \leq f7y/f \leq -0.85$;

$0.99 \leq f7y/f7x \leq 1.01$.

* * * * *